US012145726B2

(12) United States Patent
Peleg et al.

(10) Patent No.: US 12,145,726 B2
(45) Date of Patent: Nov. 19, 2024

(54) LAUNCH SYSTEM

(71) Applicant: ISRAEL AEROSPACE INDUSTRIES LTD., Lod (IL)

(72) Inventors: Eyal Peleg, Hedera (IL); Tomer Valency, Shimshit (IL); Ilan Barboi, Kfar Uriyya (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 614 days.

(21) Appl. No.: 17/268,532

(22) PCT Filed: Aug. 14, 2019

(86) PCT No.: PCT/IL2019/050910
§ 371 (c)(1),
(2) Date: Feb. 15, 2021

(87) PCT Pub. No.: WO2020/039424
PCT Pub. Date: Feb. 27, 2020

(65) Prior Publication Data
US 2021/0237872 A1 Aug. 5, 2021

(30) Foreign Application Priority Data
Aug. 19, 2018 (IL) .......................................... 262690

(51) Int. Cl.
*B64C 39/02* (2023.01)
*B64C 29/00* (2006.01)
(Continued)

(52) U.S. Cl.
CPC ........ *B64C 39/024* (2013.01); *B64C 29/0033* (2013.01); *B64U 10/13* (2023.01);
(Continued)

(58) Field of Classification Search
CPC ..... B64C 39/024; B64C 29/0033; B64C 3/56; B64C 39/02; B64U 10/13; B64U 30/12;
(Continued)

(56) References Cited

U.S. PATENT DOCUMENTS

| 2,821,924 A | * | 2/1958 | Hansen | .................. F42B 10/14 |
| | | | | 244/3.28 |
| 2,922,600 A | * | 1/1960 | Craft | ...................... F42B 10/64 |
| | | | | 244/3.21 |

(Continued)

FOREIGN PATENT DOCUMENTS

| CN | 105597334 A | 5/2016 |
| JP | 2013528528 A | 7/2013 |

(Continued)

OTHER PUBLICATIONS

Fulcrum29. "(English Translation) Tactical Benefits of 'Hypersonic Drone' for Tornado." Военное Обозрение, Oct. 23, 2015, topwar.ru/84515-prover-takticheskie-preimuschestva-giperzvukovogo-drona-dlya-smercha.html.

(Continued)

*Primary Examiner* — Medhat Badawi
(74) *Attorney, Agent, or Firm* — Dorsey & Whitney LLP

(57) ABSTRACT

According to at least one example a launch system is provided, including a carrier vehicle and at least one payload vehicle. The payload vehicle includes a payload propulsion system and aerodynamic lift surfaces designed for providing the payload vehicle with aerodynamic powered flight at a design subsonic cruise speed at a desired altitude. The carrier vehicle is configured for carrying the at least one payload vehicle at least up to the desired altitude, and further includes a solid rocket propulsion system for propelling the launch system to the desired altitude. The carrier vehicle is configured for providing a predetermined forward speed at the desired altitude, correlated to the design subsonic cruise (Continued)

speed. The carrier vehicle is configured for releasing the payload vehicle with respect to the carrier vehicle at the desired altitude and the predetermined forward speed. The design subsonic cruise speed is less than 0.7 Mach number, and, the desired altitude is greater than 3 km.

23 Claims, 9 Drawing Sheets

(51) Int. Cl.
| | | |
|---|---|---|
| B64U 10/13 | (2023.01) | |
| B64U 30/12 | (2023.01) | |
| B64U 30/20 | (2023.01) | |
| B64U 50/19 | (2023.01) | |
| B64U 70/20 | (2023.01) | |

(52) U.S. Cl.
CPC .............. B64U 30/12 (2023.01); B64U 30/20 (2023.01); B64U 50/19 (2023.01); B64U 70/20 (2023.01)

(58) Field of Classification Search
CPC ........ B64U 30/20; B64U 50/19; B64U 70/20; B64U 70/83; B64U 50/11; B64U 50/15; B64U 50/13; B64U 2101/00; H04N 1/00; B64D 17/80; B64F 1/10
See application file for complete search history.

(56) References Cited

U.S. PATENT DOCUMENTS

| | | | | |
|---|---|---|---|---|
| 2,945,442 | A * | 7/1960 | Adelman | F42B 15/36 244/3.28 |
| 3,188,958 | A * | 6/1965 | Burke | F41G 7/30 244/113 |
| 4,296,894 | A * | 10/1981 | Schnabele | F42B 15/10 244/3.1 |
| 4,601,442 | A * | 7/1986 | Friedel | F42B 10/64 244/49 |
| 4,708,304 | A * | 11/1987 | Wedertz | F42B 10/12 244/3.28 |
| 4,944,226 | A * | 7/1990 | Wedertz | F42B 10/18 102/306 |
| 4,966,078 | A * | 10/1990 | Schleimann-Jensen | F42B 10/62 102/388 |
| 5,379,968 | A * | 1/1995 | Grosso | F42B 15/01 244/3.21 |
| 5,615,847 | A * | 4/1997 | Bourlett | F42B 10/14 244/3.28 |
| 6,056,237 | A * | 5/2000 | Woodland | F42B 12/365 244/49 |
| 6,142,421 | A * | 11/2000 | Palmer | F42B 15/00 244/49 |
| 6,260,797 | B1 * | 7/2001 | Palmer | F42B 15/00 102/501 |
| 6,260,802 | B1 * | 7/2001 | Hampsten | B64D 7/08 244/49 |
| 6,286,410 | B1 * | 9/2001 | Leibolt | F41F 3/07 89/1.809 |
| 6,360,994 | B2 * | 3/2002 | Hart | B64G 1/14 244/171.3 |
| 6,576,880 | B2 * | 6/2003 | Martorana | B64C 39/024 89/1.816 |
| 6,923,404 | B1 * | 8/2005 | Liu | B64C 39/028 244/46 |
| 6,933,965 | B2 * | 8/2005 | Heafitz | F41G 3/02 348/144 |
| 7,026,540 | B1 * | 4/2006 | Doleski | B63G 8/30 114/238 |
| 7,097,136 | B2 * | 8/2006 | Ruszkowski, Jr. | F42B 15/20 244/105 |
| 7,262,394 | B2 * | 8/2007 | August | F42B 10/62 244/3.3 |
| 7,472,866 | B2 * | 1/2009 | Heaston | B63G 8/28 89/1.81 |
| 7,594,624 | B2 * | 9/2009 | Yamamoto | B64F 1/04 244/63 |
| 7,946,241 | B2 * | 5/2011 | Sampson | B63G 8/30 441/2 |
| 8,056,461 | B2 * | 11/2011 | Bossert | F41F 3/07 114/319 |
| 8,091,461 | B1 * | 1/2012 | Buescher | F41F 7/00 114/318 |
| 8,115,149 | B1 * | 2/2012 | Manole | F42B 10/18 244/45 R |
| 8,128,019 | B2 * | 3/2012 | Annati | B64D 27/24 244/12.3 |
| 8,205,828 | B2 * | 6/2012 | Bossert | F41F 3/07 114/238 |
| 8,205,829 | B2 * | 6/2012 | Bossert | F41F 3/07 114/238 |
| 8,400,511 | B2 * | 3/2013 | Wood | H04N 5/33 348/140 |
| 8,492,692 | B2 * | 7/2013 | Fisher | F41F 1/08 244/175 |
| 8,662,441 | B2 * | 3/2014 | Powell | B64C 39/024 89/1.809 |
| 9,452,820 | B1 * | 9/2016 | Wirth | B64C 39/024 |
| 9,599,992 | B2 * | 3/2017 | Kohstall | B64C 39/024 |
| 9,632,509 | B1 * | 4/2017 | Aphek | H04N 23/695 |
| 9,751,643 | B2 * | 9/2017 | Rossettini | B64G 1/64 |
| 9,758,247 | B2 * | 9/2017 | Alber | B64C 29/02 |
| 9,776,719 | B2 * | 10/2017 | Elkins | B64C 39/024 |
| 9,809,327 | B2 * | 11/2017 | Rossettini | B64G 1/403 |
| 9,938,021 | B2 * | 4/2018 | Smoker | B64F 1/04 |
| 10,118,697 | B2 * | 11/2018 | Weissenberg | B64C 39/024 |
| 10,232,938 | B2 * | 3/2019 | Yates | G05D 1/0011 |
| 10,429,839 | B2 * | 10/2019 | Liu | B64C 39/024 |
| 10,442,521 | B1 * | 10/2019 | Ellzey | B64C 5/12 |
| 10,710,715 | B2 * | 7/2020 | Yates | B64C 1/26 |
| 10,734,716 | B2 * | 8/2020 | Wangsvick | H01Q 9/0414 |
| 10,766,635 | B2 | 9/2020 | Chen | |
| 11,040,772 | B2 * | 6/2021 | Reddy | B64C 27/39 |
| 11,340,052 | B2 * | 5/2022 | Cleveland | F42B 10/64 |
| 11,525,651 | B2 * | 12/2022 | Priest | F41H 13/0075 |
| 2012/0043411 | A1 * | 2/2012 | Beck | B64C 39/024 102/374 |
| 2014/0158830 | A1 * | 6/2014 | Rossettini | B64G 1/242 244/158.6 |
| 2014/0299708 | A1 * | 10/2014 | Green | B64D 27/24 244/17.11 |
| 2015/0266578 | A1 * | 9/2015 | Elkins | B64D 1/12 244/137.1 |
| 2016/0046372 | A1 * | 2/2016 | Barnes | B64C 39/024 244/17.19 |
| 2016/0245907 | A1 * | 8/2016 | Parker | G08G 5/0026 |
| 2016/0307447 | A1 * | 10/2016 | Johnson | H04B 7/18506 |
| 2016/0320165 | A1 * | 11/2016 | Rovinsky | F42C 19/095 |
| 2017/0081047 | A1 * | 3/2017 | Rossettini | B64G 1/26 |
| 2020/0198809 | A1 * | 6/2020 | Holder | B64F 1/10 |
| 2020/0369391 | A1 * | 11/2020 | Sloman | F02K 9/00 |
| 2021/0237872 | A1 * | 8/2021 | Peleg | B64C 29/0033 |

FOREIGN PATENT DOCUMENTS

| | | |
|---|---|---|
| JP | 2017171032 A | 9/2017 |
| JP | 2017533133 A | 11/2017 |
| KR | 20120082728 A | 7/2012 |
| KR | 20140066707 A | 6/2014 |

OTHER PUBLICATIONS

Milkavkaz, director. YouTube, YouTube, Jun. 29, 2009, www.youtube.com/watch?v=fYnBmxjfld4.

* cited by examiner

SECTION A-A

LAUNCH SYSTEM

TECHNOLOGICAL FIELD

The presently disclosed subject matter relates to air vehicles, in particular to UAVs.

BACKGROUND

Unmanned aerial vehicles (UAV's) have been in use for many years, and cover many different aircraft configurations and many different uses, and can be remotely controlled or autonomously controlled. Such UAV's include fixed wing and rotor wing configurations, and uses can include, inter alia, intelligence, surveillance and reconnaissance missions.

Some missions can require aircraft configurations that provide subsonic cruise capability, optionally including loiter, and in some cases at high altitude. High lift-to-drag ratio aircraft configurations, and high span to chord ratios for these aircraft configurations, can optimize performance at subsonic cruise and high altitude. On the other hand such aircraft configurations are associated with low climb rates to such high altitudes.

GENERAL DESCRIPTION

According to a first aspect of the presently disclosed subject matter, there is provided a launch system comprising a carrier vehicle and at least one payload vehicle:
  the payload vehicle comprising a payload propulsion system and aerodynamic lift surfaces designed for providing the payload vehicle with aerodynamic powered flight at a design subsonic cruise speed at a desired altitude;
  the carrier vehicle configured for carrying the at least one payload vehicle at least up to said desired altitude, and further comprising a solid rocket propulsion system for propelling said launch system to said desired altitude;
  the carrier vehicle being configured for providing a predetermined forward speed at said desired altitude, said predetermined forward speed being correlated to said design subsonic cruise speed;
  the carrier vehicle being configured for releasing the payload vehicle with respect to said carrier vehicle at said desired altitude and said predetermined forward speed;
  wherein said design subsonic cruise speed is less than 0.7 Mach number; and
  wherein said desired altitude is greater than 3 km.

According to a variation of the first aspect of the presently disclosed subject matter, there is provided a launch system comprising a carrier vehicle and at least one payload vehicle:
  the payload vehicle comprising a payload propulsion system and aerodynamic lift surfaces designed for providing the payload vehicle with aerodynamic powered flight at a design subsonic cruise speed at a desired altitude;
  the carrier vehicle configured for carrying the at least one payload vehicle at least up to said desired altitude, and further comprising a solid rocket propulsion system for propelling said launch system to said desired altitude;
  the carrier vehicle being configured for providing a predetermined forward speed at said desired altitude, said predetermined forward speed being correlated to said design subsonic cruise speed;
  the carrier vehicle being configured for releasing the payload vehicle with respect to said carrier vehicle at said desired altitude and said predetermined forward speed;
  wherein said design subsonic cruise speed is less than 0.7 Mach number; and
  wherein said desired altitude is greater than any one of: 2 km; 1 km.

According to another variation of the first aspect of the presently disclosed subject matter, there is provided a launch system comprising a carrier vehicle and at least one payload vehicle:
  the payload vehicle comprising a payload propulsion system and aerodynamic lift surfaces designed for providing the payload vehicle with aerodynamic powered flight at a design subsonic cruise speed at a desired altitude;
  the carrier vehicle configured for carrying the at least one payload vehicle at least up to said desired altitude, and further comprising a solid rocket propulsion system for propelling said launch system to said desired altitude;
  the carrier vehicle being configured for providing a predetermined forward speed at said desired altitude, said predetermined forward speed being correlated to said design subsonic cruise speed;
  the carrier vehicle being configured for releasing the payload vehicle with respect to said carrier vehicle at said desired altitude and said predetermined forward speed;
  wherein said design subsonic cruise speed is less than 0.7 Mach number; and
  wherein said desired altitude is greater than any one of: 4 km; 5 km, 6 km; 7 km; 8 km, 10 km, 11 km, 12 km or greater than 12 km.

According to another variation of the first aspect of the presently disclosed subject matter, there is provided a launch system comprising a carrier vehicle and at least one payload vehicle:
  the payload vehicle comprising a payload propulsion system designed for providing the payload vehicle with vectored powered flight at a design subsonic cruise speed at a desired altitude;
  the carrier vehicle configured for carrying the at least one payload vehicle at least up to said desired altitude, and further comprising a solid rocket propulsion system for propelling said launch system to said desired altitude;
  the carrier vehicle being configured for providing a predetermined forward speed at said desired altitude, said predetermined forward speed being correlated to said design subsonic cruise speed;
  the carrier vehicle being configured for releasing the payload vehicle with respect to said carrier vehicle at said desired altitude and said predetermined forward speed.

For example, said design subsonic cruise speed is less than any one of: 0.7 M; 0.65 M; 0.6 M; 0.5 M; 0.45 M; 0.4 M; 0.35 M; 0.3 M; 0.25 M; 0.2 M; and/or said desired altitude is greater than any one of: 1 km, 2 km, 3 km, 4 km; 5 km, 6 km; 7 km; 8 km, 10 km, 11 km, 12 km or greater than 12 km.

According to the above first aspect, or to at least one or more of the above variations of the first aspect, of the presently disclosed subject matter, the launch system can have one or more of the following features, in any combination: For example, in at least some examples, said predetermined forward speed is subsonic, and wherein said predetermined forward speed is between zero and up to ±0.3 Mach number of said design subsonic cruise speed.

Additionally or alternatively, for example, in at least some examples, the payload vehicle is deployable between a stowed configuration and a deployed configuration, wherein said payload vehicle is in said stowed configuration when being carried by said carrier vehicle, and wherein after said release the payload vehicle is deployed to the deployed configuration, wherein said payload vehicle is designed for said aerodynamic powered flight at said design subsonic cruise speed when in said deployed configuration. For example, the payload vehicle is reversibly deployable between said stowed configuration and said deployed configuration.

Additionally or alternatively, for example, a lift to drag ratio of the payload vehicle in the deployed configuration is at least 8, or optionally at least 9, or further optionally at least 10, or further optionally greater than 10.

Additionally or alternatively, for example, said payload vehicle comprising a fuselage, and wherein in the stowed configuration said aerodynamic lift surfaces have their respective spans aligned with the fuselage, and in the deployed configuration said aerodynamic lift surfaces have their respective spans at an angular relationship with respect to the fuselage to enable generation of aerodynamic lift at said design subsonic cruise speed.

Additionally or alternatively, for example, the payload vehicle by itself is incapable of reaching said desired altitude absent said carrier vehicle.

Additionally or alternatively, for example, said payload vehicle lacks a rocket motor system, or wherein said payload propulsion system is by itself incapable of enabling the payload vehicle to reach said desired altitude, or wherein said payload propulsion system is by itself incapable of enabling the payload vehicle to reach said desired altitude within a time period of under 60 seconds, or wherein said payload propulsion system is by itself incapable of enabling the payload vehicle to reach said desired altitude within a time period of under 2 minutes.

Additionally or alternatively, for example, said rocket propulsion system comprises at least one solid rocket motor and solid propellant, configured for propelling said launch system to said desired altitude. For example, the solid rocket motor provides an ISP in the range about 180 sec to about 250 sec, and optionally in the range about 180 sec to about 200 sec, and further optionally in the range about 180 sec to about 220 sec.

Additionally or alternatively, for example, said launch system is designed to reach a maximum speed below said desired altitude, wherein said maximum speed is greater than said design subsonic cruise speed. For example, said payload vehicle is by itself incapable of attaining said maximum speed absent said carrier vehicle.

Additionally or alternatively, for example, said maximum speed is: at least 1.5 times said design subsonic cruise speed, at least 2 times said design subsonic cruise speed, at least 3 times said design subsonic cruise speed, at least 4 times said design subsonic cruise speed, at least 5 times said design subsonic cruise speed, or more than 5 times said design subsonic cruise speed.

Additionally or alternatively, for example, said payload vehicle is configured to provide a first average climb rate in the absence of said carrier vehicle, and wherein said launch system is designed to reach a second average climb rate below said desired altitude, wherein said second average climb rate is greater than said first average climb rate. For example, said payload vehicle is by itself incapable of attaining said second substantiated climb rate.

Additionally or alternatively, for example, said second climb rate is any one of: at least 2 times said first average climb rate; at least 5 times said first average climb rate; at least 10 times said first average climb rate.

Additionally or alternatively, for example, said desired altitude can be any one of: at least 5 km; at least 10 km; at least 12 km.

Additionally or alternatively, for example, said design subsonic cruise speed is less than any one of: 0.65 M; 0.6 M; 0.5 M; 0.45 M; 0.4 M; 0.35 M; 0.3 M; 0.25 M; 0.2 M.

Additionally or alternatively, for example, said payload propulsion system comprises at least one of fuel combustion engine and an electric motor, operatively coupled to a rotor, and wherein optionally said rotor is a propeller. For example, said rotor is a propeller, and wherein said propeller comprises pivoted propeller blades reversibly pivotable (or foldable/unfoldable) between a propeller stowed configuration (or folded configuration), and a propeller propulsion configuration (or unfolded configuration).

Additionally or alternatively, for example, said carrier vehicle comprises a propulsion module including said solid rocket propulsion system, and a payload module configured for carrying said payload vehicle, the propulsion module being detachably engaged to the payload module, wherein disengagement between said propulsion module and said payload module allows releasing the payload vehicle from said payload module at said desired altitude and said predetermined forward speed. For example, the payload module comprises a payload bay for accommodating the payload vehicle while the payload vehicle is being carried by the carrier vehicle, said payload vehicle being releasable from said payload module at said desired altitude and said predetermined forward speed.

Additionally or alternatively, for example, the propulsion module is configured for recovery at a first predetermined target area.

Additionally or alternatively, for example, the payload module is configured for recovery at a second predetermined target area.

Additionally or alternatively, for example, said carrier vehicle comprises a payload bay configured for accommodating said payload vehicle, wherein said payload bay is openable to allow releasing the payload vehicle from said payload bay at said desired altitude and said predetermined forward speed. For example, said carrier vehicle is configured for recovery at a predetermined third target area.

Additionally or alternatively, for example, the carrier vehicle is further configured for carrying the at least one payload vehicle at least up to said predetermined range, the carrier vehicle being configured for releasing the payload vehicle with respect to said carrier vehicle at said desired altitude, said predetermined forward speed and said predetermined range.

Additionally or alternatively, for example, said predetermined forward speed is within a range between zero and said design subsonic cruise speed.

Additionally or alternatively, for example, a weight of said carrier vehicle is in a range 20% to 50% of an all-up weight of the launch system.

Additionally or alternatively, for example, a weight of the propulsion module is in range 20% to 50% of all up weight of the carrier system 100 at launch.

Additionally or alternatively, for example, the carrier vehicle is configured for not releasing said solid rocket propulsion system therefrom when releasing the payload vehicle with respect to said carrier vehicle at said desired altitude and said predetermined forward speed.

Additionally or alternatively, for example, the carrier vehicle has an absence of a parachute that is deployable with respect to the payload vehicle at or after releasing the payload vehicle with respect to said carrier vehicle.

Additionally or alternatively, for example, the at least one payload vehicle includes at least one sensor having a line of sight (LOS) having a positive elevation (with respect to an Earth horizon).

Additionally or alternatively, for example, said positive elevation is in a direction pointing away from the Earth at least when payload vehicle is in aerodynamic powered flight at a design subsonic cruise speed at said predetermined altitude.

Additionally or alternatively, for example, said elevation is in an elevation range between 0° and 90°.

Additionally or alternatively, for example, said at least one sensor has a field of view (FOV) with respect to said LOS, wherein said FOV is less than 5°.

Additionally or alternatively, for example, said FOV is configured for enabling at least one of detecting, identifying and tracking an object. For example said object is any one of satellites, aircraft, or anti-aircraft missiles.

Additionally or alternatively, for example, said LOS has an azimuth with respect to the payload vehicle, said azimuth being between 0° and ±180° with respect to a longitudinal axis of the payload vehicle.

Additionally or alternatively, for example, said azimuth is between +90° and +180° with respect to said longitudinal axis of the payload vehicle.

Additionally or alternatively, for example, said azimuth is between −90° and −180° with respect to said longitudinal axis of the payload vehicle.

Additionally or alternatively, for example, said at least one sensor is configured for receiving electromagnetic radiation in at least one of Infrared (IR) wavelengths, ultraviolet (UV) wavelengths, or the visible spectrum.

Additionally or alternatively, for example, the launch system comprises an inertial platform, wherein said at least one sensor is mounted to said inertial platform.

According to a second aspect of the presently disclosed subject matter, there is provided a method for speed launching a payload vehicle to a desired altitude, comprising:
 (a) providing a launch system including said payload vehicle and a carrier vehicle,
 the payload vehicle comprising a payload propulsion system and aerodynamic lift surfaces designed for aerodynamic powered flight at a design subsonic cruise speed at a desired altitude;
 the carrier vehicle configured for carrying the at least one payload vehicle at least up to said desired altitude, and further comprising a solid rocket propulsion system for propelling said launch system to said desired altitude;
 the carrier vehicle being configured for providing a predetermined forward speed at said desired altitude, said predetermined forward speed being correlated to said design subsonic cruise speed;
 the carrier vehicle being configured for releasing the payload vehicle from said payload bay at said desired altitude and said predetermined forward speed;
 wherein said design subsonic speed is less than 0.7 Mach number; and
 wherein said desired altitude is greater than any one of: 5 km, or greater than 4 km, or greater than 3 km, or greater than 2 km, or greater than 1 km;
 (b) launching the launch system and causing the launch system to attain said desired altitude and said predetermined forward speed;
 (c) releasing said payload vehicle from said carrier vehicle at said desired altitude and said predetermined forward speed;
 (d) causing said payload vehicle to achieve aerodynamic powered flight at said design subsonic cruise speed at least at said desired altitude.

According to alternative variations of the second aspect of the presently disclosed subject matter, the said desired altitude is instead greater than any one of: 6 km, 7 km, 8 km, 9 km, 10 km. 11 km, 12, 15 km.

According to the above second aspect, or the above variations of the second aspect, of the presently disclosed subject matter, the method can have one or more of the following features, in any combination:

For example, said predetermined forward speed is subsonic, and wherein said predetermined forward speed is between zero and up to ±0.3 Mach number of said design subsonic cruise speed.

Additionally or alternatively, for example, the payload vehicle is deployable between a stowed configuration and a deployed configuration, and further comprising the step (d) of deploying the payload vehicle from said stowed configuration to said deployed position after said release in step (c), wherein said payload vehicle is designed for said aerodynamic powered flight at said design subsonic cruise speed when in said deployed configuration.

Additionally or alternatively, for example, said payload vehicle comprising a fuselage, and wherein in the stowed configuration said aerodynamic lift surfaces have their respective spans aligned with the fuselage, and in the deployed configuration said aerodynamic lift surfaces have their respective spans at an angular relationship with respect to the fuselage to enable generation of aerodynamic lift at said design subsonic cruise speed.

Additionally or alternatively, for example, the payload vehicle by itself is incapable of reaching said desired altitude absent said carrier vehicle, or wherein said payload vehicle lacks a rocket motor system, or wherein said payload propulsion system is by itself incapable of enabling the payload vehicle to reach said desired altitude, or wherein said payload propulsion system is by itself incapable of enabling the payload vehicle to reach said desired altitude within a time period of under 60 seconds, or wherein said payload propulsion system is by itself incapable of enabling the payload vehicle to reach said desired altitude within a time period of under 2 minutes, or wherein said rocket propulsion system comprises at least one solid rocket motor and solid propellant, configured for propelling said launch system to said desired altitude.

Additionally or alternatively, for example, in step (b) said launch system reaches a maximum speed below said desired altitude, wherein said maximum speed is greater than said design subsonic cruise speed.

Additionally or alternatively, for example, said payload vehicle is by itself incapable of attaining said maximum speed absent said carrier vehicle.

Additionally or alternatively, for example, said maximum speed is any one of: at least 2 times said design subsonic cruise speed; at least 5 times said design subsonic cruise speed; at least 3 times said design subsonic cruise speed, at least 4 times said design subsonic cruise speed.

Additionally or alternatively, for example, said payload vehicle is configured to provide a first average climb rate in the absence of said carrier vehicle, and wherein said launch system reaches a second average climb rate below said desired altitude, wherein said second average climb rate is greater than said first average climb rate. For example, said payload vehicle is by itself incapable of attaining said second substantiated climb rate. Additionally or alternatively, for example, said second climb rate is any one of: at least 2 times said first average climb rate; at least 5 times said first average climb rate; at least 10 times said first average climb rate.

Additionally or alternatively, for example, said desired altitude can be any one of: at least 5 km; at least 10 km; at least 12 km.

Additionally or alternatively, for example, design subsonic cruise speed is less than any one of: 0.65 M; 0.6 M; 0.5 M; 0.45 M; 0.4 M; 0.35 M; 0.3 M; 0.25 M; 0.2 M.

Additionally or alternatively, for example, said payload propulsion system comprises at least one of fuel combustion engine and an electric motor, operatively coupled to a rotor, wherein said rotor is a propeller, and wherein said propeller comprises pivoted propeller blades reversibly pivotable (or foldable/unfoldable) between a propeller stowed configuration (or folded configuration), and a propeller propulsion configuration (or unfolded configuration), the method comprising pivoting or unfolding the propeller blades from said propeller stowed configuration to said propeller propulsion configuration when said payload vehicle is in said deployed configuration.

Additionally or alternatively, for example, said carrier vehicle comprises a propulsion module including the solid rocket propulsion system, and a payload module configured for carrying the payload vehicle, the propulsion module being detachably engaged to the payload module, and wherein step (c) includes disengaging the propulsion module with respect to the payload module, and subsequently releasing the payload vehicle from said payload module at said desired altitude and said predetermined forward speed. For example, the method further comprises the step (e) of recovering the propulsion module at a first predetermined target area.

Additionally or alternatively, for example, step (e) comprises causing the propulsion module to follow a first trajectory to said first predetermined target area.

Additionally or alternatively, for example, the method further comprises the step (f) of recovering the payload module at a second predetermined target area. For example, step (f) comprises causing the payload module to follow a second trajectory to said second predetermined target area.

Additionally or alternatively, for example, said carrier vehicle comprises an openable payload bay configured for accommodating said payload vehicle, wherein step (c) includes opening said payload bay and releasing the payload vehicle from said payload bay at said desired altitude and said predetermined forward speed. For example, the method further comprises the step (g) of recovering the carrier vehicle at a third predetermined target area. For example, step (g) comprises causing the carrier vehicle to follow a third trajectory to said third predetermined target area.

Additionally or alternatively, for example, step (b) further comprises causing the launch system to attain a predetermined range, and wherein step (c) comprises releasing said payload vehicle from said carrier vehicle at said desired altitude, at said predetermined forward speed, and at said predetermined range.

Additionally or alternatively, for example, said predetermined forward speed forward speed is between zero and said design subsonic cruise speed.

Additionally or alternatively, for example, the method further comprises step (h), wherein step (h) comprises any one of:
reversing said deployment, wherein the payload vehicle is returned to said stowed configuration from said deployed configuration;
shedding said aerodynamic lift surfaces.

For example, step (h) is implemented just prior to touch down of the payload vehicle on a surface on termination of mission.

Additionally or alternatively, for example, the carrier vehicle does not release said solid rocket propulsion system therefrom when releasing the payload vehicle with respect to said carrier vehicle at said desired altitude and said predetermined forward speed.

Additionally or alternatively, for example, no parachute is deployed with respect to the payload vehicle at or after releasing the payload vehicle with respect to said carrier vehicle.

Additionally or alternatively, for example, the at least one payload vehicle includes at least one sensor having a line of sight (LOS), and further comprising the step of aligning said LOS with a positive elevation (with respect to an Earth horizon).

Additionally or alternatively, for example, said positive elevation is in a direction pointing away from the Earth at least when payload vehicle is in aerodynamic powered flight at a design subsonic cruise speed at said predetermined altitude.

Additionally or alternatively, for example, said elevation is in an elevation range between 0° and 90°.

Additionally or alternatively, for example, said at least one sensor has a field of view (FOV) with respect to said LOS, wherein said FOV is less than 5°.

Additionally or alternatively, for example, the method further comprises the step of using said at least one sensor for at least one of detecting, identifying and tracking an object. For example, said object is any one of satellites, aircraft, or anti-aircraft missiles.

Additionally or alternatively, for example, said LOS is aligned along an azimuth with respect to the payload vehicle, said azimuth being between 0° and ±180° with respect to a longitudinal axis of the payload vehicle.

Additionally or alternatively, for example, said azimuth is between +90° and +180° with respect to said longitudinal axis of the payload vehicle.

Additionally or alternatively, for example, said azimuth is between −90° and −180° with respect to said longitudinal axis of the payload vehicle.

Additionally or alternatively, for example, said at least one sensor is configured for receiving electromagnetic radiation in at least one of Infrared (IR) wavelengths, ultraviolet (UV) wavelengths, or the visible spectrum.

Additionally or alternatively, for example, the payload vehicle comprises an inertial platform, wherein said at least one sensor is mounted to said inertial platform.

According to a third aspect of the presently disclosed subject matter, there is provided a launch system comprising a carrier vehicle and at least one payload vehicle:
the payload vehicle comprising a payload propulsion system and aerodynamic lift surfaces designed for providing the payload vehicle with aerodynamic powered flight at a design subsonic cruise speed at a desired altitude;
the carrier vehicle configured for carrying the at least one payload vehicle, and further comprising a solid rocket propulsion system for propelling said launch system while carrying the at least one payload vehicle;

the carrier vehicle being configured for releasing the payload vehicle with respect to said carrier vehicle at a predetermined altitude;

and wherein the at least one payload vehicle includes at least one sensor having a line of sight (LOS) having a positive elevation (with respect to an Earth horizon).

For example, said positive elevation is in a direction pointing away from the Earth at least when payload vehicle is in aerodynamic powered flight at a design subsonic cruise speed at said predetermined altitude.

Additionally or alternatively, for example, said elevation is in an elevation range between 0° and 90°.

Additionally or alternatively, for example, said at least one sensor has a field of view (FOV) with respect to said LOS, wherein said FOV is less than 5°.

Additionally or alternatively, for example, said FOV is configured for enabling at least one of detecting, identifying and tracking an object. For example, said object is any one of satellites, aircraft, or anti-aircraft missiles.

Additionally or alternatively, for example, said LOS has an azimuth with respect to the payload vehicle, said azimuth being between 0° and ±180° with respect to a longitudinal axis of the payload vehicle.

Additionally or alternatively, for example, said azimuth is between +90° and +180° with respect to said longitudinal axis of the payload vehicle.

Additionally or alternatively, for example, said azimuth is between −90° and −180° with respect to said longitudinal axis of the payload vehicle.

Additionally or alternatively, for example, said at least one sensor is configured for receiving electromagnetic radiation in at least one of Infrared (IR) wavelengths, ultraviolet (UV) wavelengths, or the visible spectrum.

Additionally or alternatively, for example, the launch system comprises an inertial platform, wherein said at least one sensor is mounted to said inertial platform.

According to a fourth aspect of the presently disclosed subject matter, there is provided a method for speed launching a payload vehicle to a desired altitude, comprising:

(a) providing a launch system including said payload vehicle and a carrier vehicle, the payload vehicle comprising a payload propulsion system and aerodynamic lift surfaces designed for providing the payload vehicle with aerodynamic powered flight at a design subsonic cruise speed at a desired altitude;

the carrier vehicle configured for carrying the at least one payload vehicle, and further comprising a solid rocket propulsion system for propelling said launch system while carrying the at least one payload vehicle;

the carrier vehicle being configured for releasing the payload vehicle with respect to said carrier vehicle at a predetermined altitude;

and wherein the at least one payload vehicle includes at least one sensor having a line of sight (LOS);

(b) launching the launch system and causing the launch system to attain said desired altitude;

(c) releasing said payload vehicle from said carrier vehicle at said desired altitude;

(d) causing said payload vehicle to achieve aerodynamic powered flight at said design subsonic cruise speed;

(e) aligning said LOS with a positive elevation (with respect to an Earth horizon).

For example, said positive elevation is in a direction pointing away from the Earth at least when payload vehicle is in aerodynamic powered flight at a design subsonic cruise speed at said predetermined altitude.

Additionally or alternatively, for example, said elevation is in an elevation range between 0° and 90°.

Additionally or alternatively, for example, said at least one sensor has a field of view (FOV) with respect to said LOS, wherein said FOV is less than 5°.

Additionally or alternatively, for example, the method further comprises the step of using said at least one sensor for at least one of detecting, identifying and tracking an object. For example, said object is any one of satellites, aircraft, or anti-aircraft missiles.

Additionally or alternatively, for example, said LOS is aligned along an azimuth with respect to the payload vehicle, said azimuth being between 0° and ±180° with respect to a longitudinal axis of the payload vehicle.

Additionally or alternatively, for example, said azimuth is between +90° and +180° with respect to said longitudinal axis of the payload vehicle.

Additionally or alternatively, for example, said azimuth is between −90° and −180° with respect to said longitudinal axis of the payload vehicle.

Additionally or alternatively, for example, said at least one sensor is configured for receiving electromagnetic radiation in at least one of Infrared (IR) wavelengths, ultraviolet (UV) wavelengths, or the visible spectrum.

Additionally or alternatively, for example, the payload vehicle comprising an inertial platform, wherein said at least one sensor is mounted to said inertial platform.

A feature of at least one example of the presently disclosed subject matter is that the launch system enables the respective payload vehicle to be deployed to a desired high attitude significantly faster that any conventional system, and significantly faster than the payload vehicle by itself is able to accomplish, while the payload vehicle itself is designed for subsonic cruise. For example this allows for fast deployment to the high altitude in emergency situations.

Another feature of at least one example of the presently disclosed subject matter is that the launch system enables a payload vehicle having electrical propulsion system (i.e., wherein the propulsion system is powered exclusively by electrical power) to be deployed to a desired high attitude significantly faster than the electrical propulsion system by itself is able to accomplish, the payload vehicle itself being designed for subsonic cruise, and thus also allows for the total electrical energy stored in the batteries of the electrical prolusion system to be used for powered flight at the desired altitude. For example this allows for fast deployment to the high altitude in emergency situations.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which:

FIG. 7(*b*) schematically illustrates a variation of acceleration over time for an implementation of the examples of FIG. 1 and FIG. 6; FIG. 7(*c*) schematically illustrates a variation of mass over time for an implementation of the examples of FIG. 1 and FIG. 6; FIG. 7(*d*) schematically illustrates a variation of height over time for an implementation of the examples of FIG. 1 and FIG. 6.

DETAILED DESCRIPTION

Figure 1:
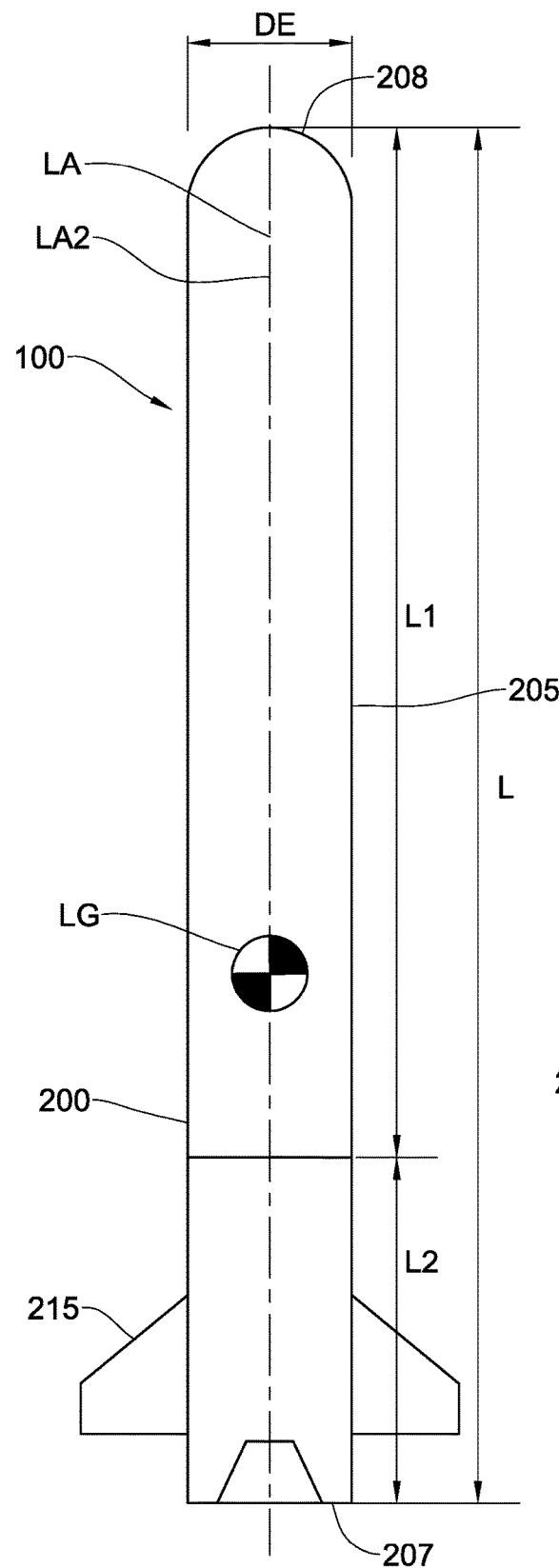
FIG. 1 is a side view of a launch system according to a first example of the presently disclosed subject matter.
Figure 2:
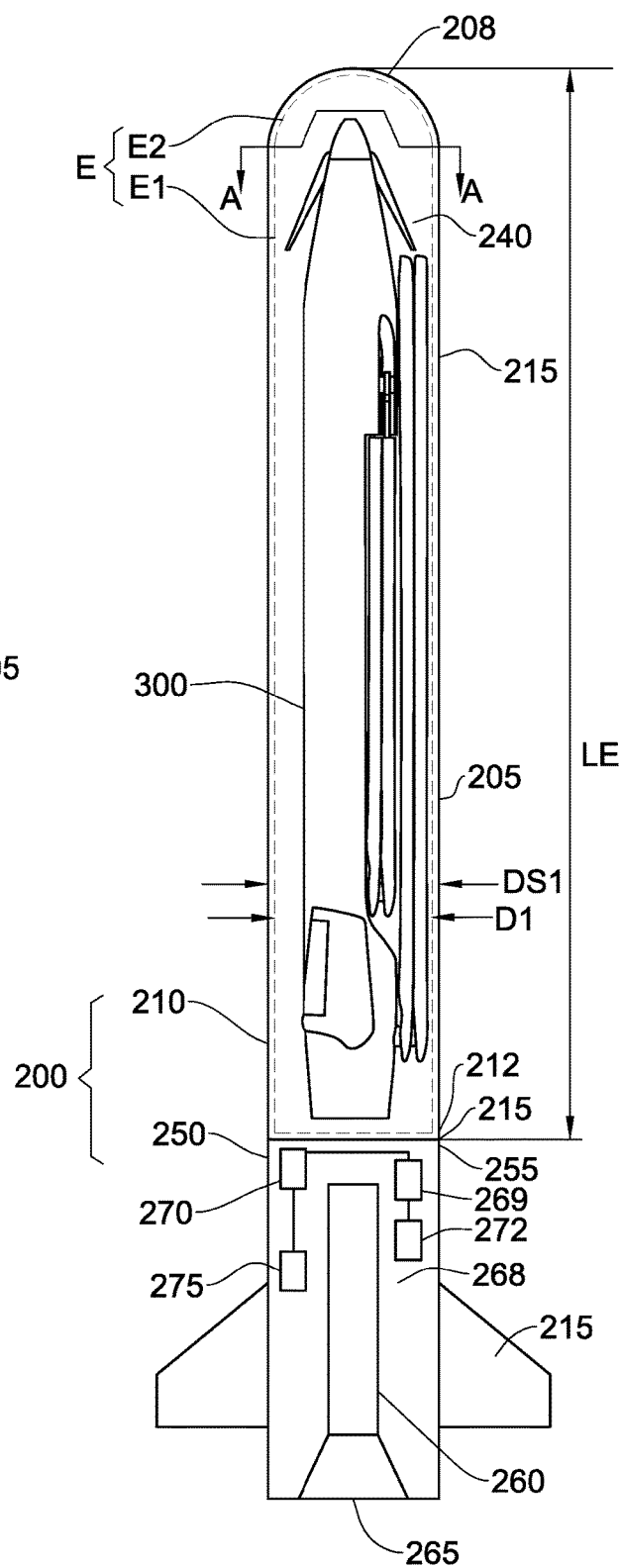
FIG. 2 is a longitudinal cross-sectional side view of the example of FIG. 1.

Referring to FIGS. 1 and 2, a launch system according to a first example of the presently disclosed subject matter, generally designated 100, comprises a carrier vehicle 200 and a payload vehicle 300. In alternative variations of this example, the launch system can comprise a carrier vehicle and a plurality of payload vehicles carried by the carrier vehicle.

The launch system 100 is particularly configured for enabling fast deployment of the payload vehicle 300 to a desired altitude H, and optionally also along a predetermined range, via the carrier vehicle 200.

As will become clearer herein, in this and other examples the payload vehicle 300 comprises a payload propulsion system and aerodynamic lift surfaces designed for providing the payload vehicle 300 with aerodynamic powered flight at a design subsonic cruise speed at a desired altitude, as well as enabling aerodynamic powered flight for the payload vehicle 300 at subsonic speeds at lower altitudes.

As will also become clearer herein, the carrier vehicle 200 is configured for carrying the payload vehicle 300 at least up to the desired altitude H, and further comprises a solid rocket propulsion system for propelling the launch system 100 to the desired altitude. Furthermore, the carrier vehicle 200 is configured for providing a predetermined forward speed at the desired altitude H, the predetermined forward speed being correlated to the subsonic cruise speed of the payload vehicle 300. For example, the predetermined forward speed is correlated to the subsonic cruise speed of the payload vehicle 300, by way of the predetermined forward speed being in the range between zero and the design subsonic cruise speed of the payload vehicle 300.

When referring to the launch system 100, the term "forward speed" refers herein to the speed of launch system 100 along a direction generally parallel to the longitudinal axis LA of the launch system 100; alternatively, when referring to the launch system 100, the term "forward speed" refers herein to the speed of launch system 100 along the direction of the trajectory of the launch system 100.

When referring to the carrier vehicle 200, the term "forward speed" refers herein to the speed of the carrier vehicle 200 along a direction generally parallel to the longitudinal axis LA2 of the carrier vehicle 200; alternatively, when referring to the carrier vehicle 200, the term "forward speed" refers herein to the speed of the carrier vehicle 200 along the direction of the trajectory of the carrier vehicle 200.

When referring to the payload vehicle 300, the term "forward speed" refers herein to the speed of the payload vehicle 300 along a direction generally parallel to the longitudinal axis LA3 of the payload vehicle 300; alternatively, when referring to the payload vehicle 300, the term "forward speed" refers herein to the speed of the payload vehicle 300 along the direction of the trajectory of the payload vehicle 300.

The carrier vehicle 200 is also configured for releasing the payload vehicle 300 with respect to the carrier vehicle 200 at the desired altitude and the predetermined forward speed.

In a least some examples, the desired altitude can be above the cloud layer and/or can be any other suitable altitude for example: at least 1 km, or at least 2 km, or at least 3 km, or at least 4 km, or at least 5 km, or at least 6 km, or at least 7 km, or at least 8 km, or at least 9 km, or at least 10 km; or at least 12 km, or at least 15 km.

Optionally, the predetermined range can be under 1 km from the launch site, for example 0 km to 1 km, or alternatively the range can be within 1 km to 5 km from the launch site, for example, when wind effect is not taken into consideration. desired altitude In at least this example, and as will be disclosed below in greater detail, the launch system 100 is typically launched vertically, or at a small angle to the vertical, in order to minimize transition time to the desired altitude. For example, such an angle can be chosen such as to ensure that the trajectory of the carrier vehicle 200 after deployment of the payload vehicle 300 will not result in the carrier vehicle landing at the launch site itself.

The carrier vehicle 200 in at least this example is configured as a single-stage rocket, and comprises a payload module 210 and a propulsion module 250. However, in alternative variations of this example, the carrier vehicle can instead be configured as a multi-stage rocket, or as a single-stage or multi-stage mixed propulsion system vehicle capable of reaching the desired altitude and/or predetermined range within a short time period, and thereby providing the necessary acceleration for so doing. By "mixed propulsion system vehicle" is meant a vehicle having a propulsion system including a solid rocket propulsion system plus at least one additional propulsion system different from the solid rocket propulsion system.

In at least this example, the payload module 210 includes payload bay 240 (also referred to herein as the payload canister), and has a longitudinal length L1 which for example can be about 70% of longitudinal length L, and the propulsion module 250 has a longitudinal length L2 which for example can be about 30% of longitudinal length L.

In at least this example, the payload module 210 including the payload vehicle 300 together have about the same weight/mass as the propulsion module 250. Furthermore in at least this example or in other examples, the weight/mass of the payload vehicle 300 is for example about 85% of the combined weight/mass of the payload module 210 together with the payload vehicle 300.

The carrier vehicle 200 in at least this example is configured as a controlled or guided missile capable of reaching the desired altitude and/or predetermined range within a short time period in a controlled manner.

However, in alternative variations of this example, the carrier vehicle can instead be configured as a ballistic rocket, capable of reaching the desired altitude and/or predetermined range within a short time period. For example, such a configuration for the carrier vehicle can optionally omit any control system for steering, other than to provide aerodynamic stability for example via aerodynamic stabilizers.

In at least this example, the carrier vehicle 200 has a body 205 of longitudinal length L, the body having a nose 208 and a blunt aft end 207. Furthermore in at least this example the body 205 has a nominally circular cross-section along length L having external diameter DE. Alternatively, the body 205 has a non-circular cross-section along length L and fits within a cylinder of external diameter DE.

The longitudinal axis LA2 of the carrier vehicle 200 extends between the nose 208 and the aft end 207, and is coaxial with the longitudinal axis LA of the launch system 100.

In this example the carrier vehicle 200 can be spin stabilized, and/or comprises a plurality, typically four, aft fins 215. In this example the fins 215 are pivotably or otherwise retractably mounted to the propulsion module 250 and have a retracted or folded configuration prior to launch. For example, the fins 215 are configured as wrap-around fins, or planar fins, initially pivoted around the body 205 in close proximity thereto in the folded configuration, and are pivoted to an unfolded configuration (for example along a pivoting axis parallel to the longitudinal axis LA2) to provide stability; optionally such wrap-around fins or planar fins can be actuated to pivot about a suitable axis to provide control moments to the carrier vehicle 200 to enable steering thereof. In another example, the fins 215 are in the form of grid fins (also known as lattice fins) initially pivoted around the body 205 in close proximity thereto in the folded configuration, and are pivoted to an unfolded configuration (for example along a pivoting axis orthogonal to the longitudinal axis LA2) to provide stability; optionally such grid fins can be actuated to pivot about a suitable axis to provide control moments to the carrier vehicle 200 to enable steering thereof.

In yet other variations of these examples, some or all of the fins 215 are fixedly attached to the body 205.

In this example, and in other examples, the launch system 100 can be launched via a suitable launch tube or via a suitable launch rail (not shown).

Soon after launch of the launch system 100, or carrier vehicle 200, fins 215 become deployed to a radially extending deployed configuration, as illustrated in FIGS. 1 and 2. In alternative variations of this and other examples, the fins can be in fixed spatial relationship with respect to the carrier vehicle 200.

The forward end of the payload module 210 includes nose 208, and the aft end 212 of the payload module 210 comprises an interface 215 for mating with a complementary interface 255 at a forward end of the propulsion module 250. In at least this example interface 215 and interface 255 are each in the form of flanges held together in a suitable manner that allows for selective separation of the payload module 210 with respect to the propulsion module 250, as will become clearer herein. For example, the interface 215 and interface 255 are each in the form of flanges held together with explosive bolts (not shown) to allow for selective disengagement of the payload module 210 with respect to the propulsion module 250 when the explosive bolts are activated. Thereafter, the payload module 210 can separate from the propulsion module 250 in any suitable manner. For example, pistons or springs provided in one or the other of the payload module 210 and the propulsion module 250 can be configured to push the payload module 210 and the propulsion module 250 away from one another. Additionally or alternatively, aerodynamic forces can be used to separate the payload module 210 with respect to the propulsion module 250. For example, such aerodynamic forces can include differences in drag between the payload module 250 and the propulsion module 250, and thereby allow separation of the propulsion module 250 with respect to the payload module 210. To further assist such aerodynamic forces, one or both of the payload module 250 and the propulsion module 250 can include air brakes that can be selectively deployed after disengagement to further differentiate the drag forces acting thereon.

In alternative variations of this example, or in other examples, interface 215 and interface 255 can comprise any other suitable arrangement that enables the payload module 210 and the propulsion module 250 to be held together until at least the desired altitude and/or predetermined range is reached, and for allowing for selective separation of the payload module with respect to the propulsion module. For example, the interface 215 and interface 255 can be held together via an explosive belt. In these or other examples the payload module 210 has an outer skin formed as a plurality of segments that tear away from one another, optionally while still attached to the propulsion module 250, to thereby allow the payload vehicle 300 to become released from the payload module 210.

In at least this example, the payload vehicle 300 is deployable between a stowed configuration and a deployed configuration. In the respective stowed configuration, and referring for example to FIG. 4, the payload vehicle 300 has a compact configuration that enables the payload vehicle 300 to be fitted within the payload bay 240 of the carrier vehicle 200 or otherwise carried by the carrier vehicle. In particular, in this example wherein the payload bay has a nominally cylindrical shape, the payload vehicle 300 also has a respective stowed configuration which fits compactly within such a nominally cylindrical shape. In the respective deployed configuration, and referring for example to FIG. 5, the payload vehicle 300 has an aerodynamic configuration that enables the payload vehicle 300 to be operated in aerodynamic flight mode when released from the carrier vehicle 200. The payload vehicle 300, in the aerodynamics flight mode, is designed for the aforementioned aerodynamic powered flight at the design subsonic cruise speed, when in said deployed configuration.

In at least this example the payload vehicle is reversibly deployable between the stowed configuration and the deployed configuration.

In at least this example, the payload module 210 is configured for accommodating therein the payload vehicle 300 in the stowed configuration thereof, and payload module 210 comprises an outer shell 215 defining the payload bay 240 therein. In at least this example, and referring in particular to FIGS. 2 and 3, the payload bay 240 defines an envelope E in which the payload vehicle 300 is to fit in its stowed configuration. The payload bay 240 is further configured for enabling the payload vehicle to be reversibly immobilizing the payload vehicle 300 in the stowed configuration with respect to the payload module, in particular the outer shell 215, for supporting the payload vehicle 300 during acceleration and deceleration phases of flight from launch of the launch system 100, and for enabling the payload vehicle 300 to be selectively released from the payload module 210, in particular the payload bay 215, following separation of the payload module 210 from the propulsion module 250.

In at least this example, the nose 208 is rounded, having a hemispherical profile, rather than an ogive or conical pointed shape. The rounded shape for the nose 208 provides additional internal space in the payload bay 240 as compared with a an ogive or conical pointed shape (for the same longitudinal length L1 for the payload module 210), and also provides higher drag after engine cutout when the lunch system begins to decelerate, as will become clearer below. However, in alternative variations of this example and in other examples, nose 208 can have an ogive or conical pointed shape. In yet other alternative variations of this example and in other examples, nose 208 can have a blunt shape, which can provide enhanced drag characteristics, as compared with for example rounded nose or an ogive nose or a pointed nose, which can facilitate deceleration of the launch system 100 prior to release of the payload vehicle 300.

In this example, envelope E includes a nominally cylindrical portion E1 of diameter D1, smaller than then inner diameter DSI of the shell 215, abutting a nominally hemispherical portion E2 complementary to the internal hemispherical geometry of the nose 208.

In at least this example, the propulsion module 250 includes solid rocket propulsion system 260, configured for providing a motive force to the launch system 100, in particular to the carrier vehicle 200, to enable the launch system 100, in particular to the carrier vehicle 200, to reach the desired altitude H and optionally also predetermined range within a predetermined time period T, and predetermined forward speed. In at least this example, the propulsion system 260 includes a solid rocket motor 265 and solid fuel propellant 268, a controller 270, as well as a suitable sensor system 269 configured for determining whether the desired altitude and/or the predetermined range and/or the time period T has been attained after launch of the launch system 100. For example, the solid rocket motor 265 provides an ISP in the range 180 sec to 250 sec, for example an ISP of up to about 200 sec or up to about 220 sec.

In at least this and other examples, the propulsion module 250 retains the solid rocket propulsion system 260 after the payload module 210 is released from the propulsion module 250, and also after the payload vehicle 300 is deployed from the payload module 210.

In at least this and other examples, each one of the weight of the solid fuel propellant 268, or of propulsion module 250, or of the carrier vehicle 200, can be 20% to 50% of the all-up weight of the launch system 100.

The propulsion module 250 further comprises suitable steering system, including for example thrust vector control (TVC) devices, and/or aerodynamic steering via fins 215.

The sensor system 269 is coupled to the controller 270, and is configured for alerting the controller 270 when the desired altitude and/or the predetermined range and/or the time period T has been attained after launch of the launch system 100. For example the sensor system 269 includes an accelerometer for enabling the controller 270 to determine when the launch system 100 is decelerating and/or has reached apogee.

Optionally, the carrier vehicle 200, in particular the propulsion module 250 includes a suitable accelerometer 272 coupled to the controller 270, configured for alerting the controller 270 when the launch system 100 is transitioning between a deceleration and an acceleration.

Optionally, the carrier vehicle 200, in particular the propulsion module 250 includes a communications module 275 coupled to controller 270. The communication module 275 is configured for enabling communication between a ground station and the carrier vehicle 200, for example by direct radio link or satellite link. For example, such communication can include telemetry communication and/or any other sensor information provided by sensors carried by the payload vehicle 200, from the carrier vehicle 200 to the ground station, and/or, can include command signals from the ground station to the carrier vehicle 200 for causing the carrier vehicle 200 to carry out various actions at launch and subsequent thereto during flight thereof.

Figure 3:
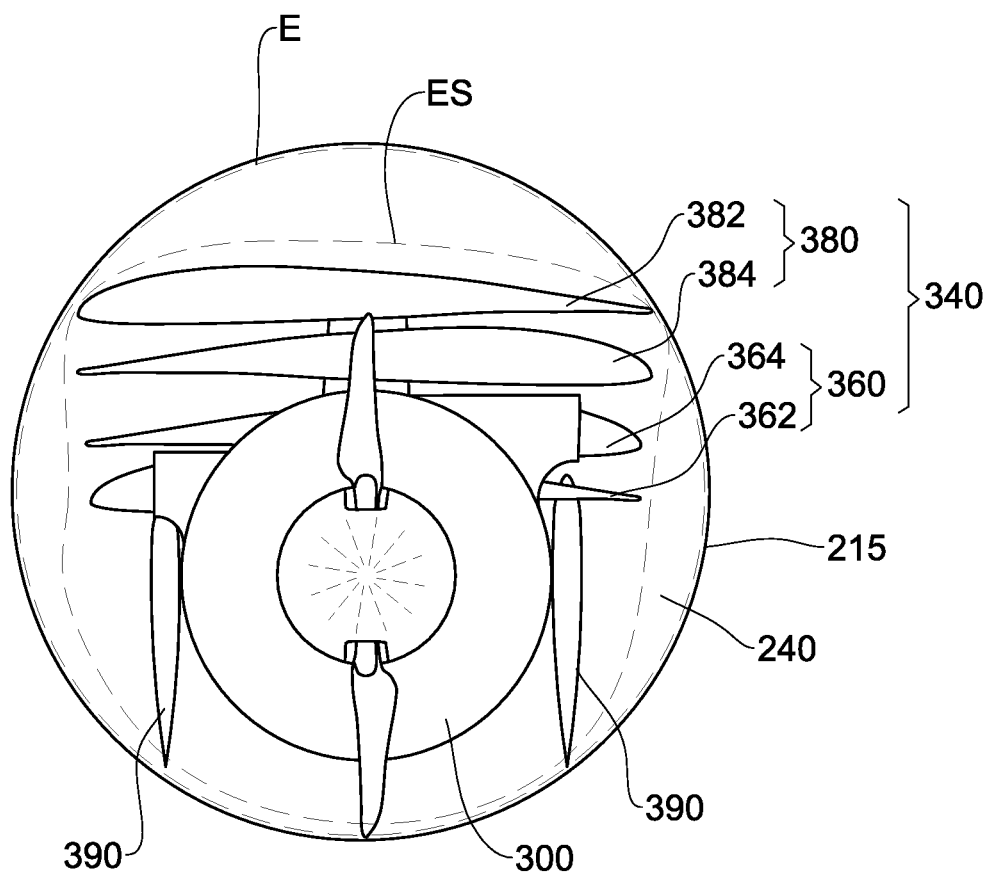
FIG. 3 is a transverse cross-sectional view of the example of FIG. 2 taken along A-A.
Figure 4:
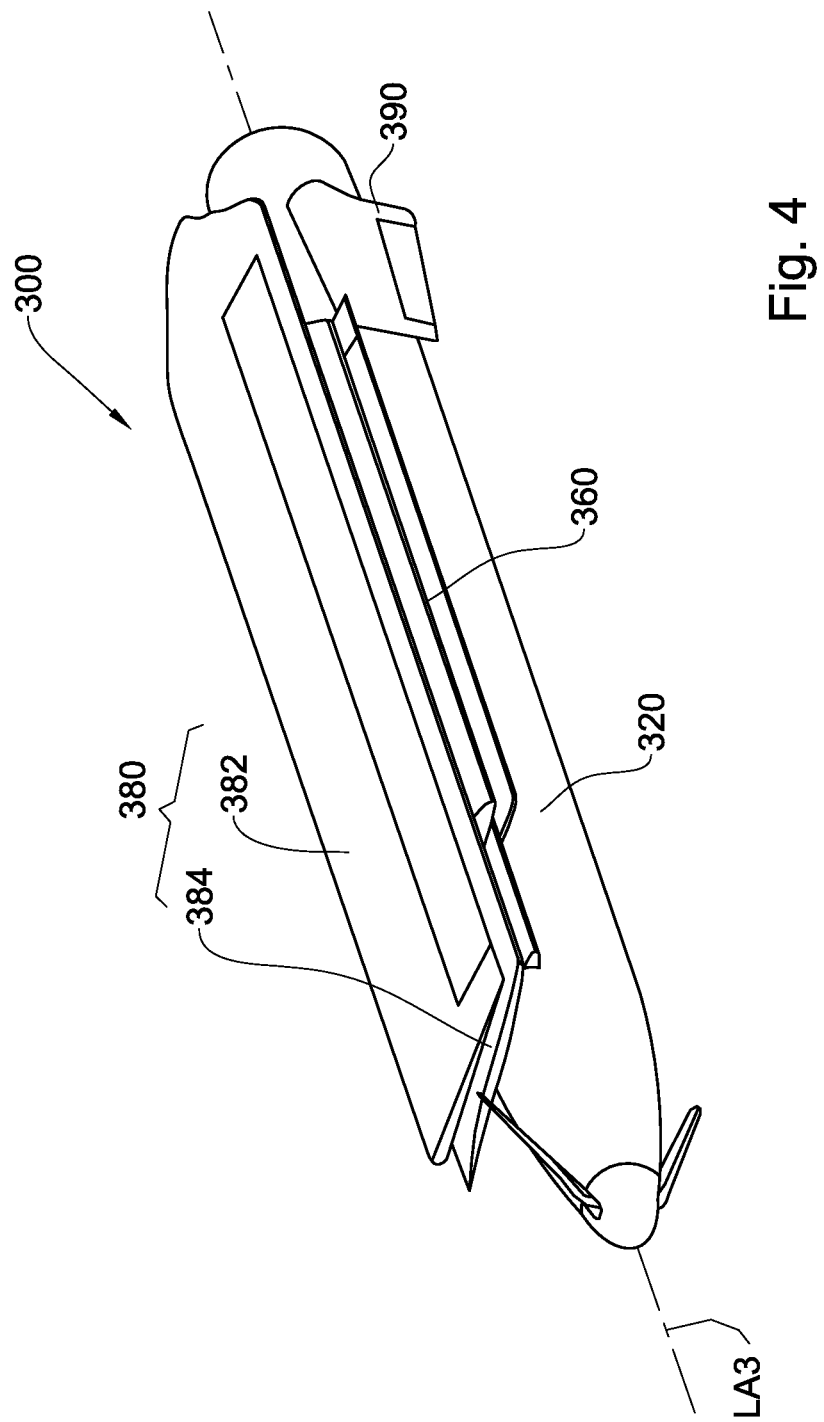
FIG. 4 is an isometric front/side/upper view of the payload vehicle of the example of FIG. 2, in stowed configuration.

Referring in particular to FIGS. 2, 3, and 4, in at least this example the payload vehicle 300, in the stowed configuration thereof, has an external stowed geometrical envelope ES that enables the payload vehicle 300 can be accommodated within envelope E. In other words, all parts of the payload vehicle 300 (when in the stowed configuration) are accommodated within envelope E, and will not traverse this envelope E. Said differently, the outside geometrical envelope ES of the payload vehicle 300 in the stowed configuration has a diameter and length not exceeding the diameter D1 and length LE of envelope E.

Figure 5:
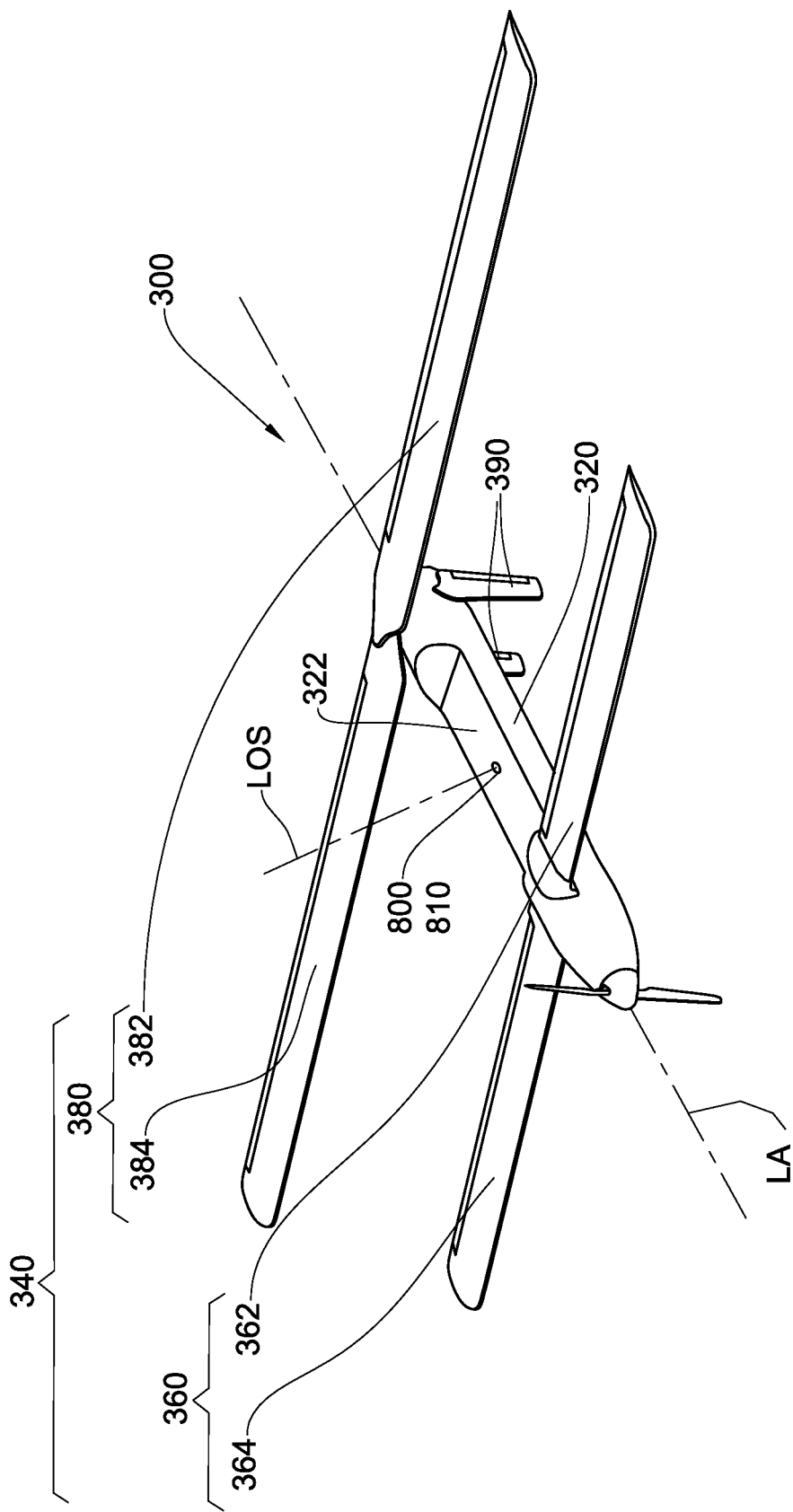
FIG. 5 is an isometric front/side/upper view of the payload vehicle of the example of FIG. 2, in deployed configuration.

Referring in particular to FIG. 5, the payload vehicle 300 has, in its deployed configuration, an external deployed geometrical envelope ED that does not enable the payload vehicle 300 to be accommodated within envelope E. In other words, at least some parts of the payload vehicle 300 (when in the deployed configuration) will traverse this envelope E.

In at least this example the payload vehicle 300 is a UAV.

While in at least this example the payload vehicle 300 is configured as a fixed-wing air vehicle, in alternative variations of this and other examples the payload vehicle can be in the form of a paraglider or any time of motorized glider. In yet other alternative variations of this and other examples the payload vehicle can be or in the form of a rotor air vehicle, for example a helicopter, autogyro, ornicopter, quadcopter, and so on, and the respective payload propulsion system is designed for providing the payload vehicle with vectored powered flight at the design subsonic cruise speed at the desired altitude.

As already mentioned, in at least this example the payload vehicle 300 has, in at least the respective deployed configuration, an aerodynamic configuration that enables the payload vehicle 300 to be operated in aerodynamic flight mode when released from the carrier vehicle 200. The term "aerodynamic flight mode" herein includes modes of operation of the payload vehicle 300 in which the payload vehicle is capable of sustained flight, for example aerodynamic powered flight, in particular at subsonic cruise conditions, in which lift is provided in an aerodynamic manner by the payload vehicle 300, for example via the aerodynamic lifting surfaces.

In at least this and other examples, the lift to drag ratio of the payload vehicle 300 in the deployed configuration is at least 8, and can be 9, 10, 11, 12, 13, 14, 15 or greater than 15.

In at least this example the payload vehicle 300 comprises a fuselage 320 and aerodynamic lifting surfaces in the form of a stowable wing system 340.

In at least this example, the stowable wing system 340 is also in tandem wing configuration, having a forward wing set 360 and an aft wing set 380.

The forward wing set 360 includes a forward port wing 362 and a forward starboard wing 364, each hingedly mounted to the fuselage 320 at respective hinges (not shown) to allow each wing to reversibly swing in a forward direction about respective pivot axes from a stowed positon in which the span of the respective wing is nominally parallel to the longitudinal axis LA3 of the fuselage 320, to a deployed position in which the span of the respective wing is significantly non-parallel to the longitudinal axis LA3 of the fuselage 320, and set at a respective sweep angle. In this example, the sweep angle is nominally 0° or close thereto.

In alternative variations of this example and in other examples, the wings of the forward wing set are aft-swept; for example the sweep angle is greater than 0° but less than 45°. In yet other alternative variations of this example and in other examples, the wings of the forward wing set are forward-swept.

In at least this example, the forward port wing 362 and the forward starboard wing 364 are located on an upper portion of the fuselage 320, and the fuselage 320 includes an upper cut-out portion 322 providing a parking space for accommodating the forward port wing 362 and the forward starboard wing 364 in the respective stowed position. Furthermore, in at least this example the forward port wing 362 and the forward starboard wing 364 are positioned at different heights on the upper portion of the fuselage 320, such that in the stowed position, one of the wings (in this example the port wing 362) is in overlying relationship with the other wing (in this example the starboard wing 364), as best seen in FIGS. 3 and 4.

The aft wing set 380 includes an aft port wing 382 and an aft starboard wing 384, each hingedly mounted to the fuselage 320 at respective hinges (not shown) to allow each wing to reversibly swing in an aft direction about respective pivot axes from a stowed position in which the span of the respective wing is nominally parallel to the longitudinal axis LA3 of the fuselage 320, to a deployed position in which the span of the respective wing is significantly non-parallel to the longitudinal axis LA3 of the fuselage 320, and set at a respective sweep angle. In this example, the sweep angle is nominally 0°. In alternative variations of this example and in other examples, the wings of the aft wing set are aft-swept; for example the sweep angle is greater than 0° but less than 45°. In yet other alternative variations of this example and in other examples, the wings of the aft wing set are forward-swept.

In at least this example, the aft port wing 382 and the aft starboard wing 384 are also located on an upper portion of the fuselage 320, above the upper cut-out portion 322 enabling the aft wing set 380 to be accommodated in overlying relationship with forward port wing 362 and the forward starboard wing 364 in their respective stowed positions. Furthermore, in at least this example the aft port wing 364 and the aft starboard wing 384 are positioned at different heights on the upper portion of the fuselage 320, such that in the stowed position, one of the wings (in this example the port wing 382) is in overlying relationship with the other wing (in this example the starboard wing 384), as best seen in FIGS. 3 and 4.

In alternative variations of this example or other examples, the aft wing set 380 can instead include variable sweep wings or oblique wings, for example.

In this example, the wings 382, 384 of the aft wing set 380 have larger spans than the wings 362, 364 of the forward wing set 360.

In at least this example, the wings 382, 384 of the aft wing set 380, and the wings 362, 364 of the forward wing set 360, can swing back to the original stowed position after the mission is terminated, for example after the payload vehicle 300 lands. In this example or other examples, the wings 382, 384 of the aft wing set 380, and the wings 362, 364 of the forward wing set 360, can swing back to the original stowed position just before payload vehicle 300 lands, for example at a height of a few meters from the ground, for example between 1 m and 10 m.

In at least this example, each one of the forward wing set 360 and the aft wing set 380 is configured as primary lift-generating wings of the payload vehicle 300. For example, the ratio of the lift generated by the forward wing set 360 to the lift generated by the aft wing set 380 can be 50:50, or alternatively 40:60, or alternatively 30:70, or alternatively 60:40, or alternatively 70:30.

In alternative variations of this example and in other examples, alternative configurations can be provided for the stowable wing system 340. For example, the forward wing set 360 can instead be configured as canards, and the aft wing set 380 is configured as the primary lift-generating wings of the payload vehicle 300.

In yet other alternative variations of this example and in other examples, the forward wing set 360 can instead be configured as the primary lift-generating wings of the payload vehicle 300, and the aft wing set 380 is configured as tailplane.

In any case, in at least this example, the payload vehicle 300 further comprises port and starboard tail fins 390 for lateral stability and control. In this example the tail fins 390 are downward projecting from a mid-height of the fuselage 320 for compactness, as can be seen particularly in FIG. 3. In at least this example, each tail fin 390 is hingedly mounted to the fuselage 320 at respective hinges (not shown) to allow each tail fin to swing in an aft direction about respective pivot axes from a stowed position (FIG. 4) in which the span of the respective fin is nominally parallel to the longitudinal axis LA3 of the fuselage 320, to a deployed position in which the span of the respective fin is significantly non-parallel to the longitudinal axis LA3 of the fuselage 320, and set at a respective angle, for example 90°, to the longitudinal axis LA3 (FIG. 5).

In at least this example the payload vehicle 300 is a powered air vehicle and comprises a propulsion system 330. In this example the propulsion system 330 comprises a tractor propeller 332 mounted at the front end of the fuselage 320, and driven by one or more electric motors, coupled to suitable batteries. In alternative variations of this example and other examples, the propulsion system 330 can additionally or alternatively comprise a pusher propeller driven by one or more electric motors. In yet other alternative variations of this example and other examples, the propulsion system can include fuel combustion engines, for example one or more internal combustion engines or one or more gas turbine engines, additionally or alternatively to the electric motors, for driving one or more rotors. Such rotor(s) can include the propeller 332, and/or can include more than one tractor propeller and/or more than one pusher propeller. In yet other alternative variations of this example and other examples, the propulsion system can replace the propeller(s) with other thrust-generating configurations, for example turbojet engines, turbofan engines, ducted fan configurations, and so on.

In examples where the propulsion system includes one or more internal combustion engines, each such internal combustion engine can be coupled to a supercharger or turbocharger, for example to enable operation at high altitudes, for example at altitudes of 5 km or higher.

It is to be noted that at least in some examples in which propulsion system 330 comprises only one electric motor or more than one electric motors, such a propulsion system cannot enable the payload vehicle 300 to attain the desired altitude H in the absence of the carrier vehicle 200, or at least not at a sufficiently high climb rate. For example, the propulsion system 330 in such a case can include regular batteries which, while adequate for providing power for cruising at the desired altitude H, can be instead depleted prior to attaining this altitude if used for propelling the payload vehicle 300 to the desired altitude in the absence of the carrier vehicle 200. Alternatively, for example, the propulsion system 330 can include heavy-duty batteries which while adequate for reaching the desired altitude H the weight of the batteries may result in propelling the payload vehicle 300 to the desired altitude, in the absence of the carrier vehicle 200, at a significantly low climb rate as compared with that of the propulsion system 100; in such a case the batteries may become significantly depleted and may not be able to provide power for cruising for a significant period.

In at least this example the propeller 332 comprises pivoted propeller blades that are pivoted aft in a position close to the fuselage 320 to enhance compactness, in the stowed configuration of the payload vehicle 300, as illustrated in FIGS. 3 and 4. For example, and particularly in the deployed configuration of the payload vehicle 300, the propeller blades are pivoted in a forward direction to a propulsion configuration (e.g. as seen in FIG. 5) under centrifugal forces when the propeller 332 is rotated by the engine, and the propeller blades are in the propulsion configuration at least until the payload vehicle 300 is landed.

In alternative variations of this example and other examples the payload vehicle 300 is a unpowered air vehicle and that does not comprises a propulsion system, and operates essentially as a glider.

In at least this example the payload vehicle 300 comprises a suitable flight controller, navigation system and other suitable sensors (not shown).

It is to be noted that in alternative variations of this example, and in other examples, the payload vehicle can include other configurations that enable the respective payload vehicle to reversibly or non-reversibly be deployed from a respective stowed configuration to a respective deployed configuration.

Optionally, the payload vehicle 300 includes a payload vehicle communications module (not shown) coupled to the flight controller. The payload vehicle communication module is configured for enabling one-way or two-way communication between a ground station and the payload vehicle 300, for example by direct radio link or satellite link. For example, such communication can include telemetry communication and/or sensor information from the payload vehicle 300 to the ground station, and/or, can include command signals from the ground station to the payload vehicle 300 for causing the payload vehicle 300 to carry out various actions at launch and subsequent thereto during flight thereof, for example to actively control the flight of the payload vehicle 300.

Optionally, the payload vehicle 300, in particular the flight controller, is configured for enabling autonomous control of the payload vehicle 300, for example to carry out a predetermined mission according to mission parameters.

In at least this example the payload vehicle 300 further comprises a payload (not shown), which at least in some examples can be mission sensitive, and thus particularly adapted for carrying out a desired mission by the payload vehicle.

Referring in particular to FIG. 5, in at least this example, and in other examples, and according to another aspect of the presently disclosed subject matter, the payload can include a sensor system 800 comprising one or more sensors 810, each sensor 810 being configured for detecting and/or receiving electromagnetic radiation within a predetermined wavelength range along a line of sight LOS. For example at least one such sensor can be:

an infrared (IR) sensor, and the predetermined wavelength range includes parts or all of the IR wavelength range of the electromagnetic spectrum; and/or an ultraviolet (UV) sensor, and the predetermined wavelength range includes parts or all of the UV wavelength range of the electromagnetic spectrum; and/or an optical sensor (for example an electro-optical sensor), and the predetermined wavelength range includes parts or all of the visible wavelength range of the electromagnetic spectrum.

Figure 9:
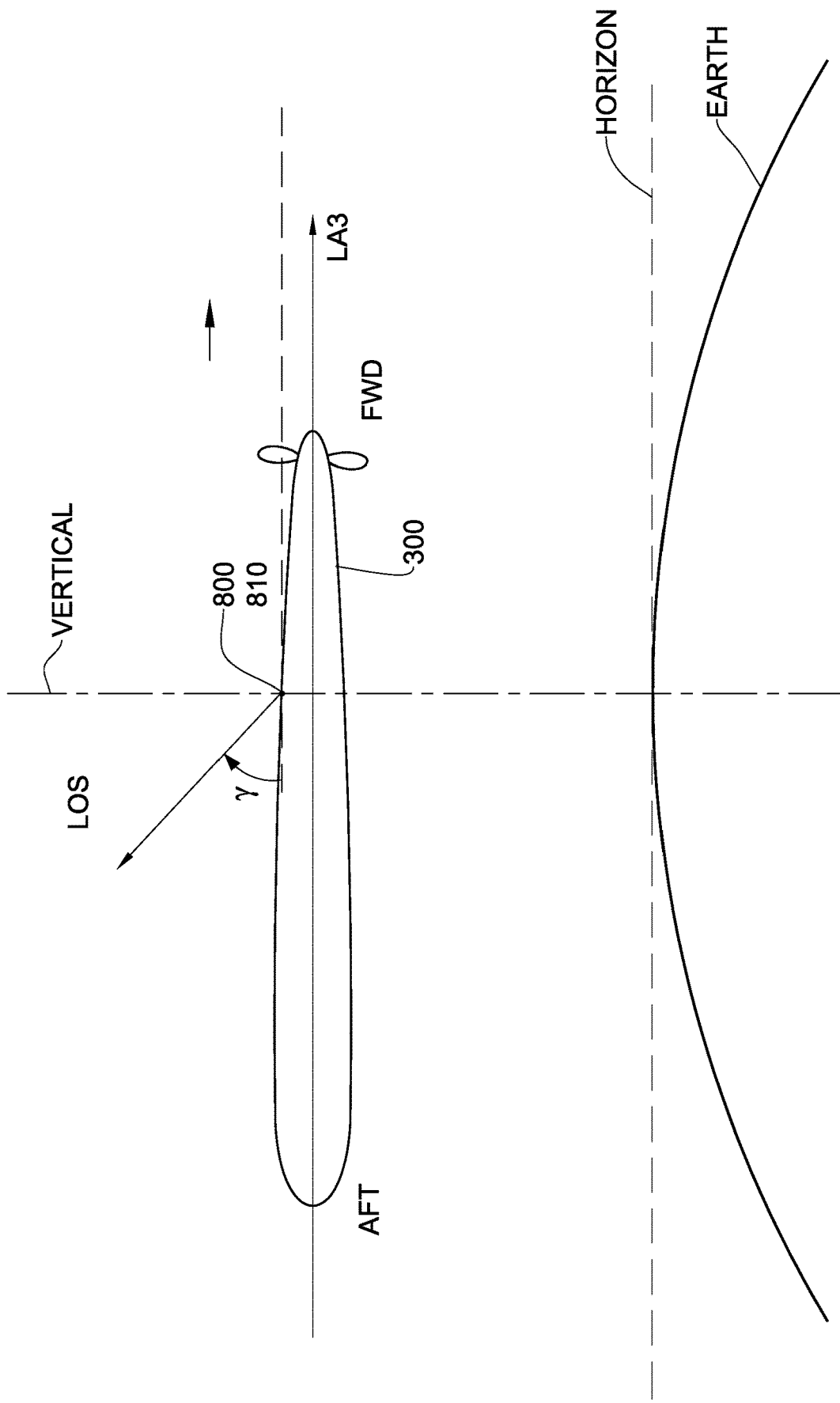
FIG. 9 schematically illustrates angle of elevation of line of sight (LOS) of a sensor of the example of FIG. 1.
Figure 10:
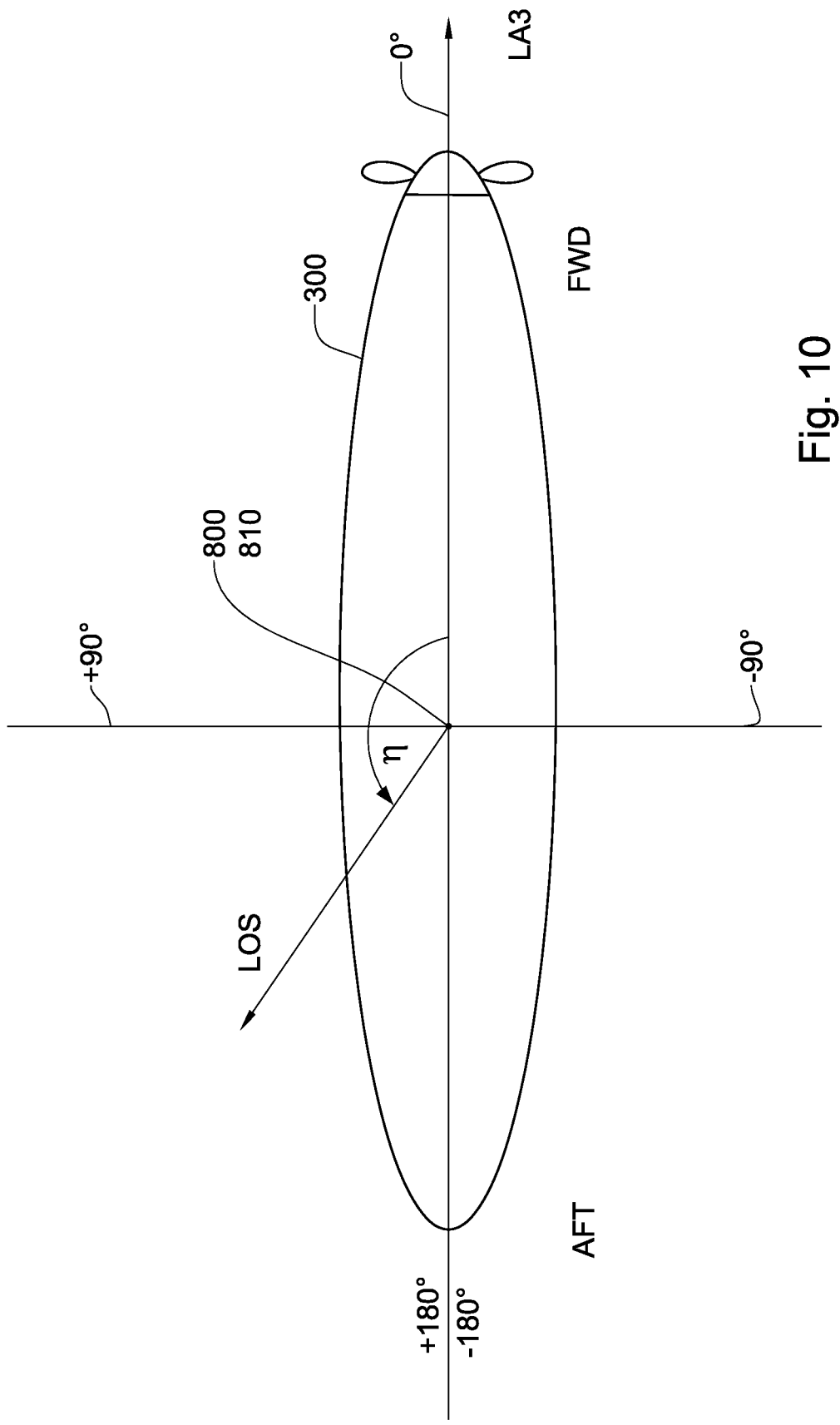
FIG. 10 schematically illustrates angle of azimuth of LOS of a sensor of the example of FIG. 9.

Referring also to FIGS. 9 and 10, each sensor 810 has its respective LOS (through the respective aperture) pointing in a direction away from the Earth, at least when the payload vehicle 300 is in aerodynamic powered flight, in particular at said predetermined altitude and at said design subsonic cruise speed. In other words, the LOS has a positive elevation g with respect to the Earth's horizon. While the elevation g of the LOS can be in the range 0° (horizontal, i.e. parallel to horizon) to 90° (vertical, i.e. orthogonal to horizon), in at least some applications the elevation g of the LOS is vertical or close thereto, for example in any one of the following ranges: 30° to 90°; 35° to 90°; 40° to 90°; 45° to 90°; 50° to 90°; 55° to 90°; 60° to 90°; 65° to 90°; 70° to 90°; 75° to 90°; 80° to 90°; 85° to 90°; 88° to 90°.

In addition, for elevation g other than 90°, the respective LOS has an azimuth q. In at least this example, and in other examples, the azimuth η is defined with respect to the payload vehicle 300, though in other examples the azimuth η can instead be defined with respect to the Earth. In particular, the azimuth η can be defined with respect to the longitudinal axis LA3 of the payload vehicle 300, when the longitudinal axis LA3 is level, i.e., horizontal with respect to the Earth. Thus: an azimuth η of 0° is in a forward direction parallel to the longitudinal axis LA3; an azimuth η of +180° or −180° is in an aft direction parallel to the longitudinal axis LA3; an azimuth η of +90° is in a port direction, orthogonal to the longitudinal axis LA3; an azimuth η of −90° is in a starboard direction, orthogonal to the longitudinal axis LA3.

In at least this example, and in other examples, the azimuth η is in a range between 0° and ±180° with respect to a longitudinal axis LA3 of the payload vehicle 300. In some examples the azimuth η is in a range between +90° and +180° with respect to a longitudinal axis LA3 of the payload vehicle 300, and/or, the azimuth η is in a range between −90° and −180° with respect to a longitudinal axis LA3 of the payload vehicle 300.

Each sensor 810 is mounted to the payload vehicle 300 in a manner that allows for the respective LOS to be pointed in the desired elevation g and azimuth q. Referring again to FIG. 5, for example, in at least this and other examples, the one or more sensors 810 are located on an upper portion of the fuselage 320, for example the upper cut-out portion 322, such that the respective apertures of the sensors 810 are facing in a generally upward direction. The one or more sensors 810 can be fixedly mounted to the upper portion of the fuselage 320, and thus the elevation g and/or azimuth η of the LOS can be changed by maneuvering the payload vehicle 300, for example by adjusting one or more of the angle of attack of the fuselage, sideslip angle, yaw angle, pitch angle or roll angle. Alternatively, the one or more sensors 810 can be movably mounted to the fuselage, for example via suitable gimbal mechanism that allows the LOS to be angularly displaced with respect to the fuselage in one, two, or three degrees of freedom.

Alternatively, the one or more sensors 810 can be located elsewhere with respect to the fuselage 320, for example the upper cut-out portion 322, in a fixed or movable manner, while ensuring that the respective apertures of the sensors 810 are facing in a generally upward direction.

The respective sensors 810 each has a field of view (FOV) with respect to said LOS. The FOV can be conceptualized with respect to an imaginary cone in which the LOS intersects the apex of the cone and is orthogonal to circular cross-sections of the cone, and having a half angle θ; the FOV can be considered to be synonymous with this half angle θ.

In at least this example, and in other examples, the FOV is less than 5°, for example.

In any case, the FOV is configured, for example optimized, for enabling detecting, and/or identifying, and/or tracking an object, along the LOS.

Such an object can be generally above the location of the payload vehicle 300 in the vertical direction, and can also be horizontally displaced with respect to the payload vehicle 300.

Such an object can be an orbiting satellites, or an aircraft, or anti-aircraft missiles, for example.

According to this aspect of the presently disclosed subject matter, the payload vehicle comprising at least one sensor having a LOS with a positive elevation g with respect to the Earth's horizon, can be launched rapidly and released at the desired altitude using any suitable launch systems, for example some types of conventional launch systems. In any case, another example of a launch system includes a payload vehicle and a carrier vehicle, wherein:

the payload vehicle comprises a payload propulsion system and aerodynamic lift surfaces designed for providing the payload vehicle with aerodynamic powered flight at a design subsonic cruise speed at a desired altitude;

the carrier vehicle is configured for carrying the at least one payload vehicle, and further comprises a solid rocket propulsion system for propelling said launch system while carrying the at least one payload vehicle;

the carrier vehicle is configured for releasing the payload vehicle with respect to said carrier vehicle at a predetermined altitude;

and the at least one payload vehicle includes at least one sensor having a line of sight (LOS).

In at least this example the payload vehicle 300 comprises a vehicle recovery system (not shown) for recovering the vehicle after the mission is terminated. For example, the vehicle recovery system can comprise a parachute to allow soft landing of the payload vehicle after the mission is terminated; optionally, the wings or part of the wings can be folded back to the stowed configuration or partially stowed configuration, or alternatively the wings can be ejected when the parachute is deployed. Alternatively the vehicle recovery system can include a suitable undercarriage that allows the payload vehicle to perform a controlled horizontal landing on a runway or other suitable surface.

According to an aspect of the presently disclosed subject matter, the launch system 100, in particular the controller 269, is configured for releasing the payload vehicle 300 from the launch system 100 (in particular from the carrier vehicle 200, in particular from the propulsion module 250) at predetermined conditions that allow for the payload vehicle 300 to achieve aerodynamic flight at low subsonic cruise conditions. For example such conditions can include a forward subsonic cruise speed of between 50 m/s and 150 m/s, and/or Mach number (M) less than 0.65 M, or less than 0.6 M, or less than 0.55 M, or less than 0.5 M, or less than 0.45 M, or less than 0.4 M, or less than 0.35 M, or less than 0.3, or less than 0.25 M, or less than 0.2 M.

According to this aspect of the presently disclosed subject matter, the launch system 100, in particular the controller 269, is configured for releasing the payload vehicle 300 from the launch system 100 (in particular from the carrier vehicle 200, in particular from the propulsion module 250) at a predetermined forward speed that is correlated to the respective subsonic cruise speed. According to this aspect of the presently disclosed subject matter, the predetermined forward speed is subsonic, and can be in the range of zero to up to ±0.3 Mach number of said design subsonic cruise speed. Thus, for example, for a subsonic cruise speed of 0.6 M, the predetermined forward speed can be in the range of 0 to 0.3 M up to the range 0 to 0.9 M.

In a first implementation of the example illustrated in FIGS. 1 to 5, the launch system 100 has a mass if about 1,000 Kg, the propulsion module 250 having a mass of about 500 Kg and the payload module 210 having a mass of about 500 kg. Referring to FIG. 1, this places the center of gravity CG of the launch system 100 longitudinally closer to the aft end 207 than the nose 208 in at least one example.

It is to be noted that in at least this example and in other examples, the payload vehicle 300 by itself is incapable of reaching the desired altitude H absent the carrier vehicle 200. For example, the payload vehicle 300 lacks a propulsion system (that is excluding the carrier vehicle 200 and its propulsion system) that is capable of propelling the payload module 300 to the desired altitude or close thereto, and for example the payload vehicle 300 itself lacks a rocket motor system capable of providing thrust for propulsion, or indeed the payload vehicle 300 itself lacks any rocket motor system.

For example, in at least this example, the payload propulsion system is by itself incapable of enabling the payload vehicle 300 to reach said desired altitude.

For example, in at least this example, the payload propulsion system is by itself incapable of enabling the payload vehicle 300 to reach the desired altitude H within a time period of less than a threshold time period, from the launch point LP, or, the payload propulsion system is by itself incapable of enabling the payload vehicle 300 to reach the desired altitude H within a time period of less than a threshold time period, from the launch point LP, and also allow for any extended cruise or loiter of the payload vehicle 300. In contrast, when carried by the carrier vehicle in the context of the launch system 100, the payload vehicle 300 can reach the desired altitude H within a time period of less than the threshold time period. In other words, in at least this example, the rocket propulsion system comprises at least one solid rocket motor and solid propellant, configured for propelling the launch system 100, including the payload vehicle 300, to the desired altitude H.

For example, the threshold time period can be within any one of: 1 to 2 minutes, or 2 minutes, or 5 minutes, or 10 minutes, or 60 seconds, or 50 seconds, or 40 seconds, or 30 seconds.

It is also to be noted that in at least this example, the launch system 100, via the thrust generated by the carrier vehicle 200, is designed to reach a maximum speed at an altitude that is below the desired altitude H, wherein this maximum speed is greater than the design subsonic cruise speed of the payload vehicle 300. Furthermore, the payload vehicle 300, in at least this example, is by itself incapable of attaining this maximum speed absent the carrier vehicle 200. For example, this maximum speed is at least 1.5 times the design subsonic cruise speed, or 2 times the design subsonic cruise speed, or 3 times the design subsonic cruise speed, or 4 times the design subsonic cruise speed, or 5 times the design subsonic cruise speed, or more than 5 times the design subsonic cruise speed.

It is also to be noted that in at least this example, the payload vehicle 300 is configured to provide a first average climb rate in the absence of the carrier vehicle 200, i.e. on its own and using the payload vehicle propulsion system only. On the other hand, the launch system 100 is designed to reach a second average climb rate at an altitude below the desired altitude, wherein the second average climb rate is greater than the first average climb rate. Such average climb rates can include respective average climb rates. In at least this example, the payload vehicle 300 is by itself incapable of attaining the second substantiated climb rate. For example the ratio of the second climb rate to the first climb rate can be any one of: 1.5, 2, 3, 4, 5, 6, 7, 8, 9, 10, or more than 10.

Figure 6:
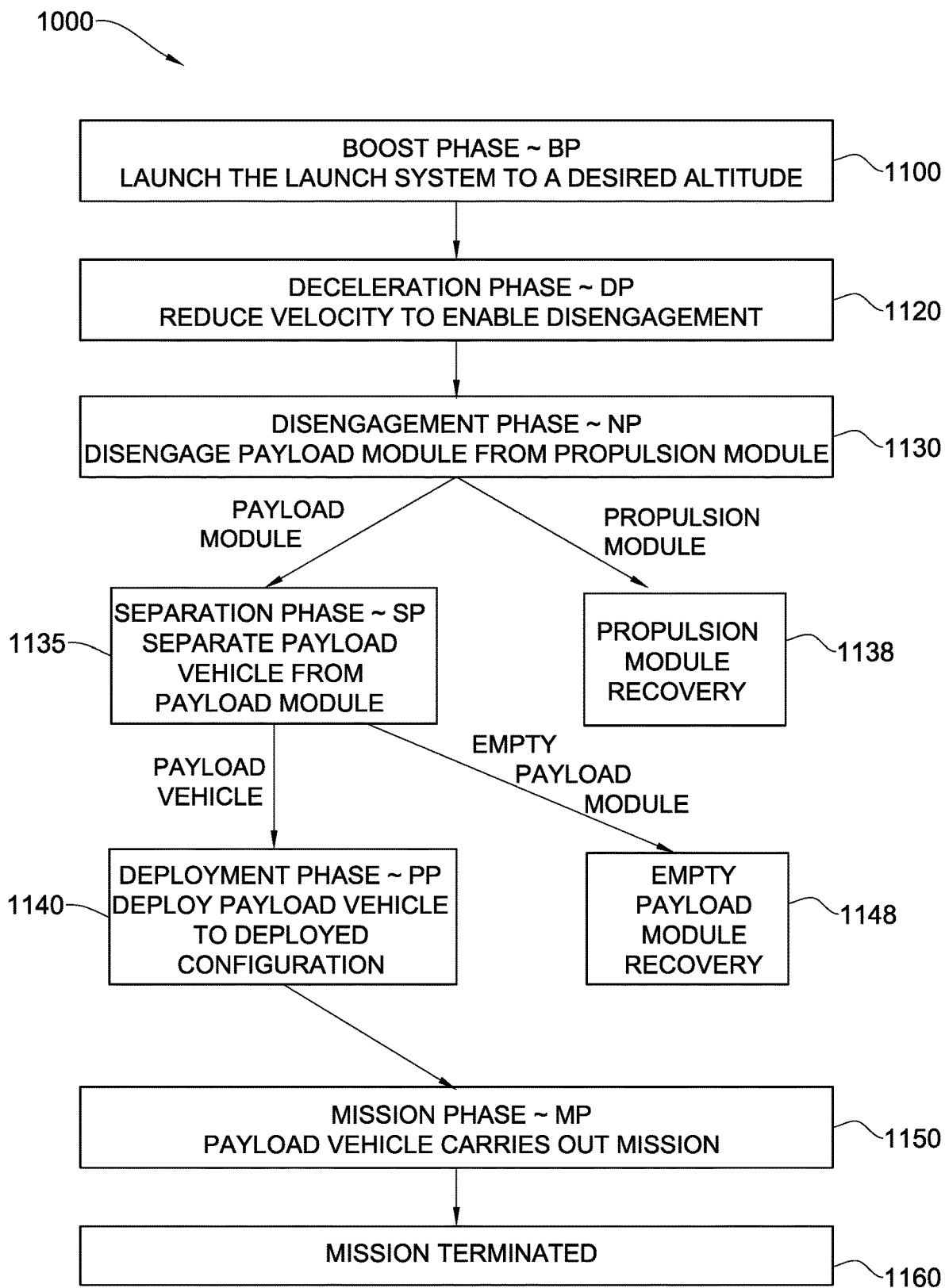
FIG. 6 schematically illustrates a method for operating the example of FIG. 1 according to an aspect of the presently disclosed subject matter.
Figure 7A:
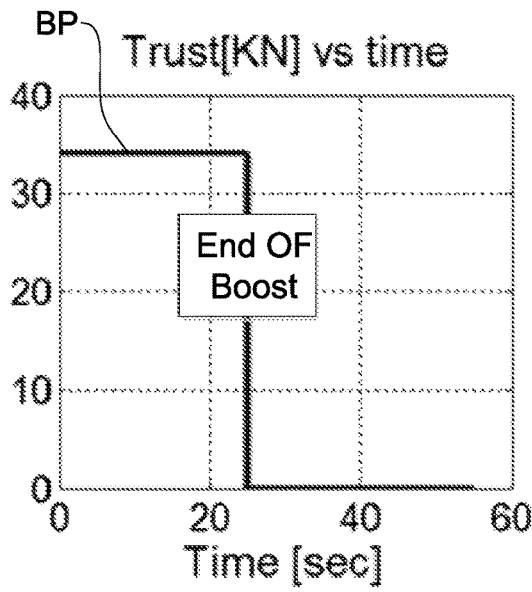
FIG. 7(*a*) schematically illustrates a variation of thrust over time for an implementation of the examples of FIG. 1 and FIG. 6.
Figure 7B:
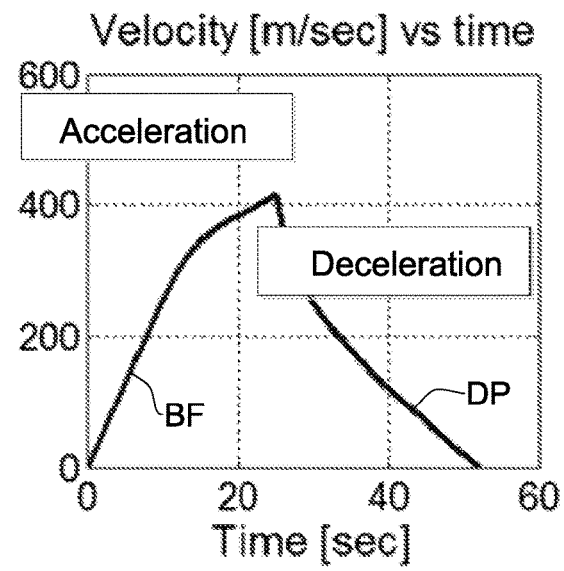
Figure 7C:
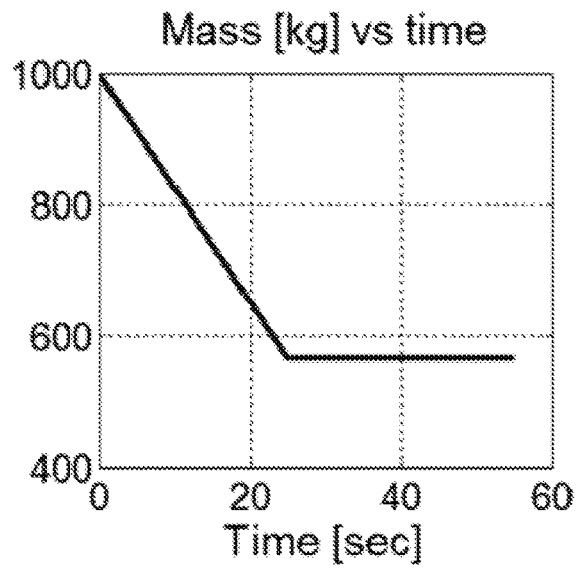
Figure 7D:
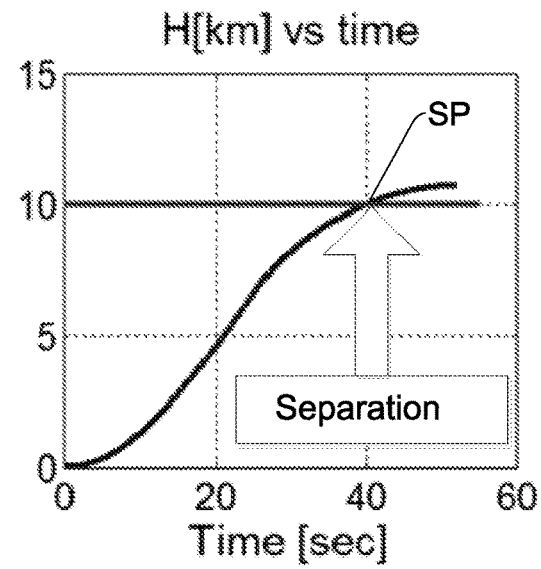

According to an aspect of the presently disclosed subject matter, and referring to FIG. 6, there is provided a first example of a method for operating the launch system 100, generally designated with reference numeral 1000, in which the payload vehicle 300 is speed-launched to a desired altitude H via the launch system 100.

According to step 1100 of method 1000, the launch system 100 is launched in a nominally vertical direction to desired altitude H from a launch point LP (FIG. 8), at an angle within up to ±15° with respect to the vertical, by operating the rocket motor 265 of the propulsion module 250. The launch system 100 undergoes a boost phase BP for a time period ΔT, during which the rocket motor generates a thrust TH, the launch system 100 undergoes acceleration, and the mass of the launch system 100 concurrently diminishes as fuel is used up. In at least this example, the velocity reached by the launch system during the boost phase BP can significantly exceed the cruising speed of the payload vehicle 300 or the maximum speed of the payload vehicle 300. Termination of thrust by the rocket motor 265 terminates the boost phase BP. In the boost phase the launch system 100 reaches an altitude HB.

For example such a launch point LP can be a permanent launch facility (for example on land or on water, for example at sea), or can include a motorized launch platform (for example on land and/or on water) that enables the location of the launch point to be mobile.

In step 1120, which is directly after period ΔT when the rocket motor stops generating thrust, there is a deceleration phase DC, in which the launch system 100 decelerates due to gravitational forces and drag acting on the launch system 100.

By way of example, the launch system 100 has a mass if about 1,000 Kg, the propulsion module 250 having a mass of about 500 Kg and the payload module 210 having a mass of about 500 Kg of which about 425 Kg is the mass of the payload vehicle 300. The rocket motor 265 has an ISP of about 200 sec, providing a thrust TH of 34KN for period ΔT of 25 sec. In this example: the variation of thrust over time is illustrated in FIG. 7(*a*); the variation of acceleration over time is illustrated in FIG. 7(*b*); the variation of mass over time is illustrated in FIG. 7(*c*); the variation of height over time is illustrated in FIG. 7(*d*).

During the deceleration phase DP it is possible for the launch system 100 to continue gaining height ΔH past the altitude HB.

Figure 8:
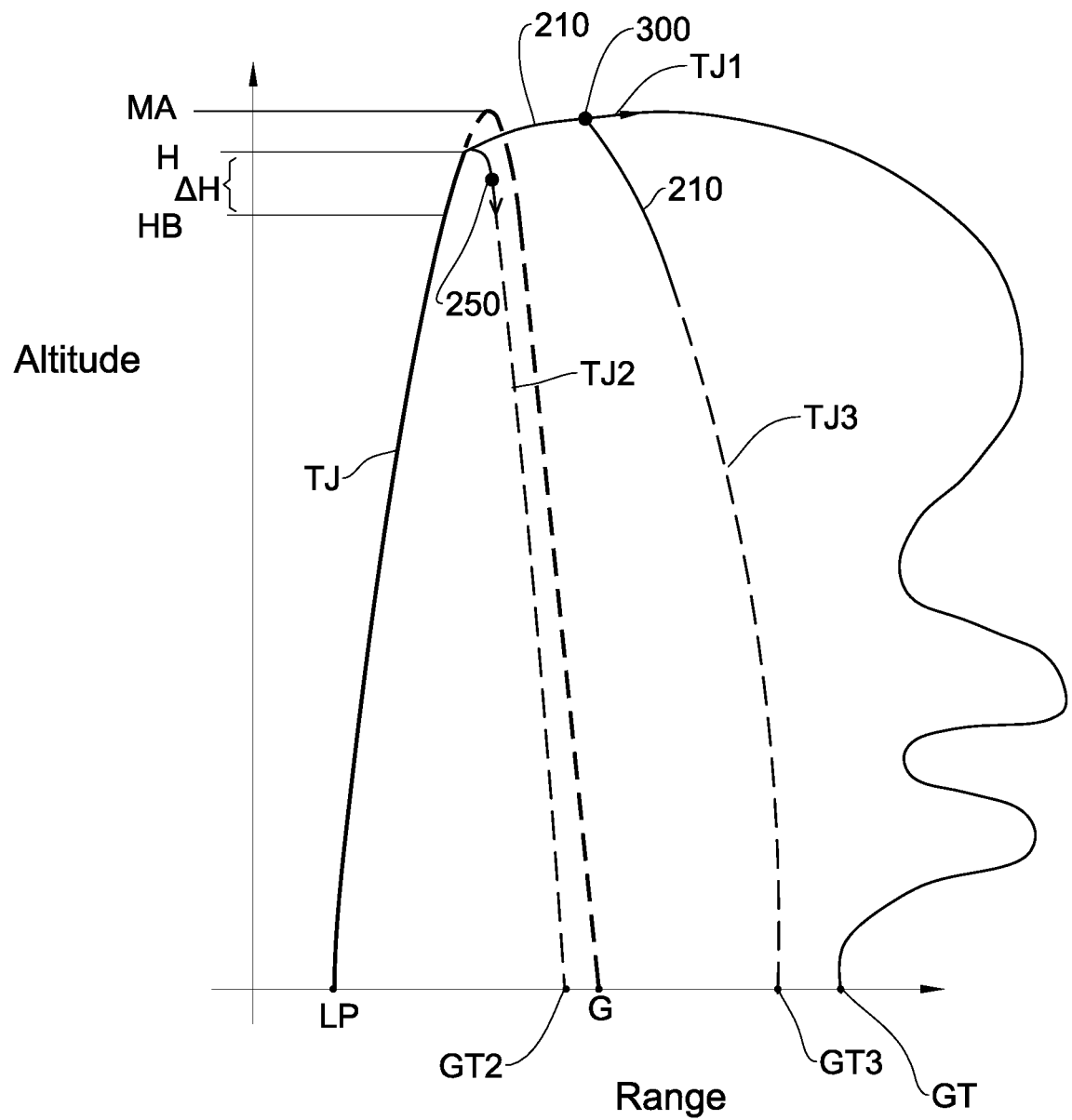
FIG. 8 schematically illustrates an example of variation of height with range for an implementation of the examples of FIG. 1 and FIG. 6.

Referring in particular to FIG. 8, during the boost phase BP and the deceleration phase DP, the launch system 100 follows a ballistic or pseudo ballistic trajectory TJ that if continued would take the launch system 100 to a maximum altitude MA at apogee, followed by acceleration of the launch system 100 towards the ground G due to gravitational forces. The speed of the launch system 100 at the maximum altitude MA is in the range between the cruising speed of the payload vehicle 300 (at the maximum altitude MA) and zero.

At a desired altitude H, which can be at the altitude BH, or within height ΔH past the altitude BH which can be at or close to the maximum altitude MA, separation of the payload vehicle 300 from the carrier vehicle 200 is initiated.

In this example this separation is carried out by first disengaging the payload module 210 from the propulsion module 250 in the disengagement stage NP of step 1130. For example this disengagement can be carried out via detonation of explosive bolts that hold the interfaces 215 and 255 together, for example responsive to a suitable command via a controller, for example controller 270.

According to this aspect of the presently disclosed subject matter, the disengagement stage NP of step 1130, occurs at a predetermined forward speed that is correlated to the respective subsonic cruise speed of the payload vehicle 300. According to this aspect of the presently disclosed subject matter, the predetermined forward speed is subsonic, and can be in the range of zero to up to ±0.3 Mach number of said design subsonic cruise speed. Thus, for example, for a subsonic cruise speed of 0.6 M, the predetermined forward speed can be in the range of 0 to 0.3 M up to the range 0 to 0.9 M.

After step 1130, the payload module 210 continues to step 1135, while concurrently the propulsion module 250 is recovered in step 1138. In step 1138, the propulsion module 250 follows a generally or nominally ballistic trajectory TJ2 towards a target area GT2. The target area GT2 can be designated as being devoid of population and/or property, and thus recovery of the propulsion module 250, for example via gravitational crash landing or soft landing (e.g. by deployment of a parachute), would thus be considered not to place people or property at risk. Such a target area GT2 can include, for example, predetermined locations at sea or the desert, or other uninhabited areas, or can include for example a fenced-off "graveyard" zone set aside for such purpose.

It is to be noted that in the disengagement stage NP of step 1130, the part of the carrier vehicle 200 that includes the rocket propulsion system, i.e., the propulsion module 250 is separated from the payload vehicle 300 (and thus while payload vehicle 300 is coupled to the payload module 210) at a forward speed that is subsonic, and which can be in the range of zero to up to ±0.3 Mach number of said design subsonic cruise speed of the payload vehicle 300.

The desired altitude DH in the trajectory TJ is chosen such that the forward speed S of the launch system 100 is within a desired speed range and/or the dynamic pressure of the launch system 100 is within a desired dynamic pressure range, that will enable the payload vehicle 300 to attain subsonic aerodynamic flight at or under the design cruise speed. In at least one example, the desired altitude is also above the cloud base. For example such forward speed S is at or below 100 m/s. For example, the desired altitude can be about 10 km, and this altitude can be reached via the launch system 100 in about 40 seconds in at least the above example. This forward speed is subsonic, and can be in the range of zero to up to ±0.3 Mach number of said design subsonic cruise speed. Thus, for example, for a subsonic cruise speed of 0.6 M, the predetermined forward speed can be in the range of 0 to 0.3 M up to the range 0 to 0.9 M.

In step 1135, the payload vehicle 300 is separated from the payload module 210: the payload vehicle 300 continues to step 1140, while concurrently the empty payload module 210 is recovered in step 1148. In step 1148, the empty payload module 210 follows a generally or nominally ballistic trajectory TJ3 towards a target area GT3. The target area GT3 can be designated as being devoid of population or property, and thus recovery of the empty payload module 210, for example via gravitational crash landing or soft landing (e.g. by deployment of a landing parachute), would thus be considered not to place people or property at risk. Such a target area GT3 can include, for example, predetermined locations at sea or the desert, or other uninhabited areas, or can include for example a fenced-off "graveyard" zone set aside for such purpose.

The target area GT3 can be the same as the target area GT2, or alternatively target area GT3 and target area GT2 can be different from one another.

In step 1140, the deployment phase PP, the now-released payload vehicle 300 is operated to attain the deployed configuration. In the example illustrated in FIGS. 1 to 5, the forward port wing 362 and the forward starboard wing 364 of the forward wing set 360 are pivoted outwardly in as forward direction, the aft port wing 382 and the aft starboard wing 384 of the aft wing set 360 are pivoted outwardly in an aft direction, and the tail fins 390 are pivoted outwardly in a downwardly direction. The propeller 332 is spun by the engine, and the propeller blades of propeller 332 are pivoted in a forward direction to the propulsion configuration under centrifugal forces.

In the deployed configuration, and having an initial forward speed S within the aforesaid speed range, the payload vehicle 300 attains powered low subsonic aerodynamic flight. In at least this example, said powered low subsonic aerodynamic flight proceeds at airspeed between 50 m/s and 150 m/s, and/or Mach number less than 0.65 M, or less than 0.6 M, or less than 0.55 M, or less than 0.5 M, or less than 0.45 M, or less than 0.4 M, or less than 0.35 M, or less than 0.3, or less than 0.25 M, or less than 0.2 M.

In step 1150 the payload vehicle 300 proceeds with the mission in the mission phase MP, the mission having mission goals, which can be preset or can be interactively set via communication with a ground station. In pursuance of the mission goals, the payload vehicle 300 can loiter or cruise at the desired altitude H, or change this altitude, responsive to control signals provided by the flight controller, which can be preprogrammed, or can include control signals provided by the ground station via the payload vehicle communications module.

Optionally, and depending on the nature of the mission and mission goals, the payload vehicle 300 can provide mission data, relevant to the mission goals and acquired during the mission, to the ground base via the payload vehicle communication module. For example, such mission data can include sensor information obtained via sensors comprised in the payload vehicle 300.

The mission data can relate, for example, to electromagnetic data obtained via the one or more sensors 810, along the respective line of sight (LOS).

In step 1160 the mission is terminated, and the payload vehicle 300 is recovered. Step 1160 can occur after the mission goals are accomplished, in which the payload vehicle 300 can be flown (under propulsion or unpowered) to a designated target area GT for a controlled landing.

In at least some examples, step 1160 can include reversing the aforesaid deployment of the payload vehicle 300, in which the payload vehicle 300 is returned to the stowed configuration from the deployed configuration, and this can be executed just prior to landing or touchdown of the payload vehicle 300, for example within 2 to 10 meters from the landing surface.

In at least some examples, step 1160 can include shedding all or a portion of the aerodynamic lift surfaces of the payload vehicle 300, and this can be executed just prior to landing or touchdown of the payload vehicle 300, for example within 2 to 10 meters from the landing surface. In such cases the payload vehicle 300 is configured for selectively shedding all or part of the aerodynamic lift surfaces thereof, which in this example include the wings 382, 384 of the aft wing set 380, and the wings 362, 364 of the forward wing set 360. For example, some or all of the wings 382, 384 of the aft wing set 380 and the wings 362, 364 of the forward wing set 360 are connected to the fuselage 320 via explosive bolts, which can be selectively activated to enable the respective wings to be shed from the fuselage 320.

Optionally, the payload vehicle 300 can include a self-destruct system (not shown) for destroying the payload vehicle 300 under certain circumstances, and actuation of the self-destruct system can constitute step 1160 under such circumstances. Such circumstances can include, for example an instance where the payload vehicle is partially damaged or is low on fuel or propulsion energy, and is expected to make landfall over undesired territory, in which case it is desired that the payload vehicle not fall into undesired hands. Such circumstances can also include, for example an instance where the payload vehicle 300 is steered towards a target that it is desired to damage or destroy via the self-destruction of the payload vehicle.

Such a self-destruct system can take many forms. For example, the self-destruct system can be in the form of commands to the flight controller to follow a flight path to ensure collision with the ground or with a target at maximum momentum. Alternatively, the self-destruct system can include an explosive charge in which detonation thereof results in the payload vehicle 300 becoming destroyed or severely damaged.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A launch system, comprising: a carrier vehicle; and at least one payload vehicle; wherein the payload vehicle includes a payload propulsion system and aerodynamic lift surfaces designed for providing the payload vehicle with aerodynamic powered flight at a design subsonic cruise speed at a desired altitude; wherein the carrier vehicle is configured for carrying the at least one payload vehicle, and further comprising a solid rocket propulsion system for propelling said launch system while carrying the at least one payload vehicle; wherein the carrier vehicle is configured for releasing the payload vehicle with respect to said carrier vehicle at a predetermined altitude; wherein the at least one payload vehicle includes at least one sensor having a respective line of sight (LOS) through a respective aperture of the sensor, the at least one sensor is mounted with respect to the payload vehicle such that the respective LOS is inclined at a positive elevation and the respective said aperture is facing in a direction pointing away from the Earth at least during a portion of said aerodynamic powered flight wherein said payload vehicle is in cruise.

2. The launch system according to claim 1, wherein said at least one sensor has a field of view (FOV) with respect to said LOS, wherein said FOV is less than 5°.

3. The launch system according to claim 2, wherein said FOV is configured for enabling at least one of detecting, identifying, or tracking an object.

4. The launch system according to claim 3, wherein said object is any one of satellites, aircraft, or anti-aircraft missiles.

5. The launch system according to claim 1, wherein said at least one sensor is configured for receiving electromagnetic radiation in at least one of Infrared (IR) wavelengths, ultraviolet (UV) wavelengths, or the visible spectrum.

6. The launch system according to claim 1, further comprising an inertial platform, wherein said at least one sensor is mounted to said inertial platform.

7. The launch system according to claim 1, wherein the carrier vehicle is configured for providing a predetermined forward speed at said desired altitude, said predetermined forward speed correlated to said design subsonic cruise speed, and wherein said predetermined forward speed is subsonic, and wherein said predetermined forward speed is between zero and up to ±0.3 Mach number of said design subsonic cruise speed.

8. The launch system according to claim 1, wherein the payload vehicle is deployable between a stowed configuration and a deployed configuration, wherein said payload vehicle is in said stowed configuration when carried by said carrier vehicle, and wherein after said release the payload vehicle is deployed to the deployed configuration, wherein said payload vehicle is designed for said aerodynamic powered flight at said design subsonic cruise speed when in said deployed configuration.

9. The launch system according to claim 1, wherein:
said payload vehicle lacks a rocket motor system;
when unpowered, said payload propulsion system is incapable of enabling the payload vehicle to reach said desired altitude;
when unpowered, said payload propulsion system is incapable of enabling the payload vehicle to reach said desired altitude within a time period of under 60 seconds; or
when unpowered, said payload propulsion system is incapable of enabling the payload vehicle to reach said desired altitude within a time period of under 2 minutes.

10. The launch system according to claim 1, wherein said launch system is designed to reach a maximum speed below said desired altitude, wherein said maximum speed is greater than said design subsonic cruise speed.

11. The launch system according to claim 1, wherein said desired altitude is any one of: at least 3 km; at least 5 km; at least 10 km; or at least 12 km.

12. The launch system according to claim 1, wherein design subsonic cruise speed is less than any one of: 0.7 M; 0.65 M; 0.6 M; 0.55 M; 0.5 M; 0.45 M; 0.4 M; 0.35 M, 0.3 M, 0.25 M, 0.2 M.

13. The launch system according to claim 12, wherein said rotor includes a propeller, and wherein said propeller includes pivoted propeller blades reversibly pivotable between a propeller stowed configuration and a propeller propulsion configuration.

14. The launch system according to claim 1, wherein said carrier vehicle includes a propulsion module including said solid rocket propulsion system, and a payload module configured for carrying said payload vehicle, the propulsion module detachably engaged to the payload module, wherein disengagement between said propulsion module and said payload module allows releasing the payload vehicle from said payload module at said desired altitude and said predetermined forward speed.

15. A method for launching a payload vehicle to a predetermined altitude, the method comprising:
providing a launch system including said payload vehicle and a carrier vehicle;
wherein the payload vehicle comprising a payload propulsion system and aerodynamic lift surfaces designed for providing the payload vehicle with aerodynamic powered flight at a design subsonic cruise speed at a desired altitude;
wherein the carrier vehicle is configured for carrying the at least one payload vehicle, and further comprising a solid rocket propulsion system for propelling said launch system while carrying the at least one payload vehicle;
wherein the carrier vehicle is configured for releasing the payload vehicle with respect to said carrier vehicle at a predetermined altitude;
wherein the at least one payload vehicle includes at least one sensor having a respective line of sight (LOS) through a respective aperture of the sensor;
launching the launch system and causing the launch system to attain said desired altitude;
releasing said payload vehicle from said carrier vehicle at said desired altitude;
causing said payload vehicle to achieve aerodynamic powered flight at said design subsonic cruise speed; and
aligning said LOS with a positive elevation and with the respective said aperture facing in a direction pointing away from the Earth at least during a portion of said aerodynamic powered flight wherein said payload vehicle is in cruise.

16. The method according to claim 15, wherein said at least one sensor has a field of view (FOV) with respect to said LOS, wherein said FOV is less than 5°.

17. The method according to claim 16, further comprising using said at least one sensor for at least one of detecting, identifying, or tracking an object.

18. The method according to claim 17, wherein said object is any one of satellites, aircraft, or anti-aircraft missiles.

19. The method according to claim 15, wherein said at least one sensor is configured for receiving electromagnetic radiation in at least one of Infrared (IR) wavelengths, ultraviolet (UV) wavelengths, or the visible spectrum.

20. The launch system according to claim 1, wherein said LOS is in any one of the following ranges: 30° to 90'; 35° to 90°.

21. The launch system according to claim 1, wherein said LOS is in any one of the following ranges: 40° to 90°; 45° to 90°; 50° to 90°; 55° to 90°; 60° to 90°; 65° to 90°; 70° to 90°; 75° to 90°; 80° to 90°; 85° to 90°; 88° to 90°.

22. The method according to claim 15, wherein said LOS is in any one of the following ranges: 30° to 90°; 35° to 90°.

23. The method according to claim 15, wherein said LOS is in any one of the following ranges: 40° to 90°; 45° to 90°;

50° to 90°; 55° to 90°; 60° to 90°; 65° to 90°; 70° to 90°; 75° to 90°; 80° to 90°; 85° to 90°; 88° to 90°.

\* \* \* \* \*